(12) United States Patent
Smits et al.

(10) Patent No.: US 11,692,566 B2
(45) Date of Patent: Jul. 4, 2023

(54) IN-PLANE TRANSVERSE MOMENTUM INJECTION TO DISRUPT LARGE-SCALE EDDIES IN A TURBULENT BOUNDARY LAYER

(71) Applicant: Deep Science, LLC, Bellevue, WA (US)

(72) Inventors: Alexander J. Smits, Princeton, NJ (US); Ivan Marusic, Essendon (AU); David Wine, Seattle, WA (US); Brian Holloway, Snoqualmie, WA (US)

(*) Notice: Subject to any disclaimer, the term of this patent is extended or adjusted under 35 U.S.C. 154(b) by 0 days.

(21) Appl. No.: 17/938,399

(22) Filed: Oct. 6, 2022

(65) Prior Publication Data

US 2023/0044837 A1 Feb. 9, 2023

Related U.S. Application Data

(63) Continuation of application No. 17/673,535, filed on Feb. 16, 2022, now Pat. No. 11,466,709.
(Continued)

(51) Int. Cl.
*F15D 1/12* (2006.01)
*B64C 23/00* (2006.01)
(Continued)

(52) U.S. Cl.
CPC .............. *F15D 1/12* (2013.01); *B64C 23/005* (2013.01); *F15D 1/007* (2013.01); *F15D 1/065* (2013.01);
(Continued)

(58) Field of Classification Search
CPC . F15D 1/12; F15D 1/008; F15D 1/007; F15D 1/065; F15D 1/0065; B64C 23/005;
(Continued)

(56) References Cited

U.S. PATENT DOCUMENTS

| 1,903,823 A | 4/1933 | Lougheed |
| 2,440,198 A | 4/1948 | Green |

(Continued)

FOREIGN PATENT DOCUMENTS

| EP | 1481467 B1 | 12/2004 |
| EP | 2012139 A1 | 1/2009 |

(Continued)

OTHER PUBLICATIONS

U.S. Appl. No. 16/696,810, Non-Final Office Action dated Jun. 27, 2022, 11 pp.
(Continued)

*Primary Examiner* — Minh Q Le
(74) *Attorney, Agent, or Firm* — PCFB, LLC; Justin K. Flanagan

(57) ABSTRACT

Systems and methods are described herein to implement transverse momentum injection at low frequencies to directly modify large-scale eddies in a turbulent boundary layer on a surface of an object. A set of transverse momentum injection actuators may be positioned on the surface of the object to affect large-scale eddies in the turbulent boundary layer. The system may include a controller to selectively actuate the transverse momentum injection actuators with an actuation pattern to affect the large-scale eddies to modify the drag of the fluid flow on the surface. In various embodiments, the transverse momentum injection actuators may be operated at frequencies less than 10,000 Hertz.

21 Claims, 24 Drawing Sheets

Related U.S. Application Data

(60) Provisional application No. 63/155,408, filed on Mar. 2, 2021, provisional application No. 63/150,183, filed on Feb. 17, 2021.

(51) Int. Cl.
    *F15D 1/00* (2006.01)
    *F15D 1/06* (2006.01)
    *B62D 35/00* (2006.01)
    *B64C 9/02* (2006.01)
    *B64C 9/04* (2006.01)
    *B64C 21/00* (2023.01)

(52) U.S. Cl.
    CPC ............... *B62D 35/00* (2013.01); *B64C 9/02* (2013.01); *B64C 9/04* (2013.01); *B64C 21/00* (2013.01); *B64C 2230/12* (2013.01); *F15D 1/008* (2013.01)

(58) Field of Classification Search
    CPC .. B64C 9/02; B64C 9/04; B64C 21/00; B64C 2230/12; B62D 35/00
    USPC ............. 137/803; 244/200.1, 204, 205, 99.8, 244/123.12, 123.13
    See application file for complete search history.

(56) References Cited

U.S. PATENT DOCUMENTS

| | | |
|---|---|---|
| 3,289,978 A | 12/1966 | Banaszak |
| 3,578,264 A | 5/1971 | Kuethe |
| 4,102,519 A | 7/1978 | Crosby |
| 4,309,901 A | 1/1982 | Rolinski |
| 4,516,747 A | 5/1985 | Lurz |
| 4,526,031 A | 7/1985 | Weisend |
| 4,611,492 A | 9/1986 | Koosmann |
| 4,932,612 A | 6/1990 | Blackwelder |
| 5,037,044 A | 8/1991 | Seyfang |
| 5,106,017 A | 4/1992 | Hicks |
| 5,209,438 A | 5/1993 | Wygnanski |
| 5,359,574 A | 10/1994 | Nadolink |
| 5,365,490 A | 11/1994 | Katz |
| 5,369,345 A | 11/1994 | Phan |
| 5,374,011 A | 12/1994 | Lazarus |
| 5,445,346 A | 8/1995 | Gilbert |
| 5,531,407 A | 7/1996 | Austin |
| 5,540,406 A | 7/1996 | Occhipinti |
| 5,558,156 A | 9/1996 | Tsutsui |
| 5,558,304 A | 9/1996 | Adams |
| 5,573,012 A | 11/1996 | McEwan |
| 5,598,990 A | 2/1997 | Farokhi |
| 5,755,408 A | 5/1998 | Schmidt |
| 5,808,210 A | 9/1998 | Herb |
| 5,874,671 A | 2/1999 | Lopez |
| 5,942,682 A | 8/1999 | Ghetzler |
| 5,953,773 A | 9/1999 | Asada |
| 5,957,413 A | 9/1999 | Glezer |
| 5,961,080 A | 10/1999 | Sinha |
| 5,964,433 A | 10/1999 | Nosenchuck |
| 5,988,522 A | 11/1999 | Glezer |
| 5,988,568 A | 11/1999 | Drews |
| 6,016,286 A | 1/2000 | Olivier |
| 6,024,119 A | 2/2000 | Kirschner |
| 6,109,565 A | 8/2000 | King, Sr. |
| 6,123,145 A | 9/2000 | Glezer |
| 6,123,296 A | 9/2000 | Mangalam |
| 6,131,853 A | 10/2000 | Bauer |
| 6,215,221 B1 | 4/2001 | Cabuz |
| 6,332,593 B1 | 12/2001 | Kamiadakis |
| 6,443,394 B1 | 9/2002 | Weisend, Jr. |
| 6,484,971 B2 | 11/2002 | Layukallo |
| 6,644,598 B2 | 11/2003 | Glezer |
| 6,662,647 B2 | 12/2003 | Schoess |
| 6,795,763 B2 | 9/2004 | Yao |
| 6,821,090 B1 | 11/2004 | Hassan |
| 6,862,502 B2 | 3/2005 | Peltz |
| 6,871,816 B2 | 3/2005 | Nugent |
| 6,874,748 B2 | 4/2005 | Hanagan |
| 6,966,231 B2 | 11/2005 | Sheplak |
| 6,979,050 B2 | 12/2005 | Browne |
| 7,031,871 B2 | 4/2006 | Severson |
| 7,133,785 B2 | 11/2006 | Larson |
| 7,204,731 B2 | 4/2007 | Gusler |
| 7,251,592 B1 | 7/2007 | Praisner |
| 7,375,911 B1 | 5/2008 | Li |
| 7,380,756 B1 | 6/2008 | Enloe et al. |
| 7,434,170 B2 | 10/2008 | Novak |
| 7,537,182 B2 | 5/2009 | Greenblatt |
| 7,703,839 B2 | 4/2010 | McKnight |
| 7,854,467 B2 | 12/2010 | McKnight |
| 7,913,928 B2 | 3/2011 | Tiliakos |
| 8,006,939 B2 | 8/2011 | McClure |
| 8,074,938 B2 | 12/2011 | Hyde et al. |
| 8,074,939 B2 | 12/2011 | Hyde et al. |
| 8,091,950 B2 | 1/2012 | Corke et al. |
| 8,267,355 B1 | 9/2012 | Patel et al. |
| 8,286,909 B2 | 10/2012 | Lee |
| 8,308,112 B2 | 11/2012 | Wood et al. |
| 8,436,509 B1 | 5/2013 | Branch |
| 8,640,995 B2 | 2/2014 | Corke et al. |
| 8,783,337 B2 | 7/2014 | Hyde |
| 8,794,574 B2 | 8/2014 | Lang |
| 8,894,019 B2 | 11/2014 | Alvi |
| 9,002,484 B2 | 4/2015 | Hyde et al. |
| 9,410,527 B2 | 8/2016 | Hsu |
| 9,541,106 B1 | 1/2017 | Patel et al. |
| 9,834,301 B1 | 12/2017 | Patel et al. |
| 9,848,485 B2 | 12/2017 | Corke et al. |
| 9,883,822 B2 | 2/2018 | Bhagavat |
| 9,908,616 B1 | 3/2018 | Horn |
| 10,527,074 B2 | 1/2020 | Corke et al. |
| 10,543,908 B2 | 1/2020 | Stefes |
| 11,299,260 B2 | 4/2022 | Wine |
| 11,466,709 B2 | 10/2022 | Smits |
| 2002/0079405 A1 | 6/2002 | Layukallo |
| 2002/0125376 A1 | 9/2002 | Kamiadakis |
| 2002/0131474 A1 | 9/2002 | Suga |
| 2004/0197519 A1 | 10/2004 | Elzey |
| 2004/0249257 A1 | 12/2004 | Tupin |
| 2005/0088057 A1 | 4/2005 | Kando |
| 2005/0121240 A1 | 6/2005 | Aase |
| 2005/0163963 A1 | 7/2005 | Munro |
| 2005/0241605 A1 | 11/2005 | Bedwell |
| 2006/0022092 A1 | 2/2006 | Miller |
| 2006/0040532 A1 | 2/2006 | Ozawa |
| 2006/0060722 A1 | 3/2006 | Choi |
| 2006/0236777 A1 | 10/2006 | Chambers |
| 2007/0113932 A1 | 5/2007 | Tiliakos |
| 2008/0128027 A1 | 6/2008 | Hyde |
| 2008/0128560 A1 | 6/2008 | Hyde |
| 2008/0128561 A1 | 6/2008 | Hyde |
| 2008/0193307 A1 | 8/2008 | Elata |
| 2008/0245520 A1 | 10/2008 | Hyde |
| 2009/0173837 A1 | 7/2009 | Silkey et al. |
| 2010/0123046 A1 | 5/2010 | Khozikov |
| 2010/0219296 A1 | 9/2010 | Shelman-Cohen |
| 2011/0224846 A1 | 9/2011 | Simon |
| 2011/0295102 A1 | 12/2011 | Lakkis |
| 2012/0193483 A1 | 8/2012 | Essenhigh |
| 2013/0009016 A1 | 1/2013 | Fox |
| 2015/0191244 A1 | 7/2015 | Rolston |
| 2015/0257653 A1 | 9/2015 | Hyde |
| 2016/0089052 A1 | 3/2016 | Cho |
| 2016/0174842 A1 | 6/2016 | Hyde |
| 2018/0298762 A1 | 10/2018 | Shelman-Cohen |
| 2019/0136881 A1 | 5/2019 | Amitay |
| 2020/0031456 A1 | 1/2020 | Wine |
| 2020/0148335 A1 | 5/2020 | Wine |
| 2020/0176664 A1 | 6/2020 | Wine |
| 2020/0191177 A1 | 6/2020 | Wine |

(56) References Cited

U.S. PATENT DOCUMENTS

| | | |
|---|---|---|
| 2020/0217337 A1 | 7/2020 | Loebig |
| 2021/0348628 A1 | 11/2021 | Holloway |
| 2022/0260098 A1 | 8/2022 | Smits |

FOREIGN PATENT DOCUMENTS

| | | |
|---|---|---|
| FR | 1053332 A | 2/1954 |
| WO | 2001076934 A1 | 10/2001 |
| WO | 2002103304 A2 | 12/2002 |
| WO | 2006040532 A1 | 4/2006 |
| WO | 2012054086 A1 | 4/2012 |
| WO | 2016179405 A1 | 11/2016 |
| WO | 2016189448 A2 | 12/2016 |
| WO | 2022177960 A1 | 8/2022 |

OTHER PUBLICATIONS

PCT International Patent Application No. PCT/US2019/063409, International Search Report and Written Opinion dated Feb. 21, 2020, 11 pp.

Deep Science, LLC, International Patent Application PCT/US2022/016560, International Search Report and Written Opinion dated May 30, 2022, 10 pp.

Mahfoze O et al., "Skin-friction drag reduction in a channel flow with streamwise-aligned plasma actuators," Int'l J. of Heat and Fluid Flow, Butterworth Scientific LTD., Guildford, GB, vol. 66, Jun. 6, 2017, pp. 83-94.

Alfredsson et al., Large-Eddy Breakup Devices—a 40 Years Perspective from a Stockholm Horizon, Flow Turbulence Combust (2018), vol. 100, pp. 877-888.

Cattafesta et al., Actuators for Active Flow Control, Annu. Rev. Fluid Mech. 2001.43, pp. 247-272.

Corke et al., Active and Passive Turbulent Boundary layer Drag Reduction, AIAA Journal (Oct. 2018), vol. 56, No. 10, pp. 3835-3847.

Garcia-Mayoral et al., Drag rReduction by riblets, Phil. Trans. R. Soc. A (2011), vol. 369, pp. 1412-1427.

Gatti et al., Reynolds-number dependence of turbulent skin-friction drag reduction induced by spanwise forcing, Journal of Fluid Mechanics (2016), vol. 802, pp. 553-582.

Gouder, Turbulent Friction Drag Reduction Using Electroactive Polymer Surfaces, Doctoral thesis, Imperial College, May 2011.

Kline et al., The structure of turbulent boundary layers, Journal of Fluid Mechanics (1967), vol. 30, pp. 741-773.

Leschziner, Friction-Drag Reduction by Transverse Wall Motion—A Review, J. of Mechanics,DOI: 10.1017/mech.2020.31, 15 p.

Marusic et al., Predictive model for wall-bounded turbulent flow, Science (2010), vol. 329(5988), pp. 193-196.

Mathis et al., Estimating wall-shear-stress fluctuations given an outer region input, Journal of Fluid Mechanics (2013), vol. 715, pp. 163-180.

Panton, Overview of the self-sustaining mechanisms of wall turbulence, Prog. Aerosp. Sci. (2001), vol. 37, pp. 341-383.

Smith et al., The characteristics of low-speed streaks in the near-wall region of a turbulent boundary layer, Journal of Fluid Mechanics (1983), vol. 129, pp. 27-54.

Smits et al., High Reynolds Number Wall Turbulence, Annu. Rev. Fluid Mech. (2011), vol. 43, pp. 353-375.

Thomas et al., Turbulent drag reduction using pulsed-DC plasma actuation, J. of Physics D: Appl. Phys. 52 (2019) 434001, 13 p.

Schoppa et al., A large-scale control strategy fordrag reduction in turbulent boundary layers, Physics of Fluids (May 1998); vol. 10(5), pp. 1049-1051.

Smits, et al., U.S. Appl. No. 17/673,535, Notice of Allowance dated Jul. 26, 2022, 11 pp.

U.S. Appl. No. 16/740,154, Non-Final Office Action dated May 6, 2022, 24 pp.

U.S. Appl. No. 16/674,870, Non-Final Office Action dated May 26, 2022, 22 pp.

International Patent Application PCT/US2019/059919, International Search Report dated Apr. 15, 2020, 17 pp.

Gouder et al., "Turbulent Friction Drag Reduction Using electroactive Polymer & Electromagnetically-driven Surfaces", Jan. 17, 2013, Experiments in Fluids, vol. 53, pp. 1-13.

Ainajjar et al., "Receptivity of High-Speed Jets to Excitation Using an Array of Mems-based Mechanical Actuators", ASME Fluids Engineering Division Summer Meeting, Jun. 22-26, 1997, pp. 1-6.

Bird et al., "Compliant Kagome Lattice Structures for Generating in-plane Waveforms", Jun. 1, 2018, vol. 141-142, pp. 86-101.

Bird et al., "Experimental Control of Turbulent Boundary Layers with In-plane Travelling Waves", May 14, 2018, Flow Turbulence Combust, vol. 100, pp. 1015-1035.

Bird et al., "In-Plane Forcing of a Turbulent Boundary Layer, Through the Actuation of a Compliant Structure", EDRFCM, Mar. 23-26, 2015, pp. 1-2.

Braslow, "A History of Suction-Type Laminar-Flow Control with Emphasis on Flight Research", Jan. 1, 1999, pp. 1-84.

Bushnell, "Chapter VIII: Compliant Surfaces Introduction", Viscous Flow Drag Reduction, Jan. 1, 1980, pp. 387-390.

Chamorro et al., "Drag Reduction of Large Wind Turbine Blades through Riblets: Evaluation of Riblet Geometry and Application Strategies", Feb. 2013, Renewable Energy, vol. 50, pp. 1095-1105.

Examination Report issued on GB0911332.5 dated Mar. 31, 2011, 4 pages.

Examination Report issued on GB0911333.3 dated Oct. 25, 2010, 2 pages.

Gad-El-Hak and BUSHNELL, "Separation Control: Review", Journal of Fluids Engineering, Mar. 1991, vol. 113, pp. 5-30.

Gad-El-Hak, "Chapter 9: Drag Reduction Using Compliant Walls", Flow Past Highly Compliant Boundaries and in Collapsible Tubes, Eds. Carpenter and Pedley, Mar. 26-31, 2001, pp. 191-229.

Gatti and Quadrio et al., "Reynolds-number Dependence of Turbulent Skin-friction Drag Reduction Induced by Spanwise Forcing", Sep. 10, 2016, J. Fluid Mech., vol. 802, pp. 553-582.

Gatti, "Turbulent Drag Reduction at Moderate Reynolds Number via Spanwise Velocity Waves", PAMM, Dec. 3, 2012, pp. 563-564.

Grosjean et al., "Micro Balloon Actuators for Aerodynamic Control", IEEE Proceedings MEMS 98, Jan. 25-28, 1998, pp. 1-6.

Hong et al., "Turbulent Drag Reduction with Polymers in Rotating Disk Flow", Jul. 13, 2015, Polymers, vol. 7, pp. 1279-1298.

Huang et al., "MEMS Transducers for Aerodynamics-A Paradym Shift", 38th Aerospace Sciences Meeting, Jan. 10-13, 2000, pp. 1-7.

Hurst et al., "The Effect of Reynolds Number on Turbulent Drag Reduction by Streamwise Travelling Waves," Nov. 25, 2014, J. Fluid Mech., vol. 759, pp. 28-55.

Jones et al., "Modelling for Robust Feedback Control of Fluid Flows", Feb. 2015, Journal of Fluid Mechanics, vol. 769, pp. 1-34.

Jung et al., "Suppression of Turbulence in Wall-bounded flows by High-frequency Spanwise Oscillations", Aug. 1992, Phys. Fluids A, vol. 4, No. 8, pp. 1605-1607.

Kang and Choi, "Active Wall Motions for Skin-Friction Drag Reduction", Dec. 2000, Physics of Fluids, vol. 12, No. 12, pp. 3301-3304.

Karniadakis and Choi, "Mechanism on Transverse Motions in Turbulent Wall Flows", Jan. 2003, Annu. Rev. Fluid Mech., vol. 35, pp. 45-62.

Kasagi et al., "Toward Cost-Effective Control of Wall Turbulence of Skin Friction Drag Reduction", Sep. 7-10, 2009, Advances in Turbulence XII, pp. 189-200.

Laadhari et al., "Turbulence Reduction in a Boundary Layer by a Local Spanwise Oscillating Surface", Oct. 1994, Physics of Fluids, vol. 6, pp. 3218-3220.

Lee et al., "Control of Roll Moment by MEMS", American Society of Mechanical Engineers, Dec. 1, 1996, pp. 797-803.

Luhar et al., "A Framework for Studying the Effect of Compliant Surface on Wall Turbulence", Apr. 10, 2015, J. Fluid Mech., vol. 768, pp. 415-441.

Melton et al., "Active Flow Control via Discrete Sweeping and steady Jets on a Simple-Hinged Flap", Aug. 2018, AIAA Journal, vol. 56, No. 8, pp. 2961-2973.

(56) References Cited

OTHER PUBLICATIONS

Morrison, "MEMS Devices for Active Drag Reduction in Aerospace Applications", Mar. 27, 2014, Electronic and Optical Materials, pp. 153-176.
Naguib et al., "Arrays of MEMS-based Actuators for Control of Supersonic Jet Screech", AIAA, Jun. 29, 1997-Jul. 2, 1997, pp. 1-9.
Quadrio and Ricco, "The Laminar Generalized Stokes Layer and Turbulent Drag Reduction", Jan. 25, 2011, J. Fluid. Mech., vol. 667, pp. 135-157.
Quadrio et al., "Streamwise-traveling Waves of Spanwise Wall Velocity for Turbulent Drag Reduction", May 25, 2009, vol. 627, pp. 161-178.
Ricco, "Active and Passive Turbulent Drag Reduction" Workshop on Turbulent Skin Friction Drag Reduction, Imperial College London, Dec. 4-5, 2017, pp. 1-60.
Sareen et al., "Drag Reduction Using Riblet Film Applied to Airfoils for Wind turbines", 49th Aerospaces Sciences Meeting, Jan. 4-7, 2011, pp. 1-19.
Schroder, "Drag Reduction via Transversal Wave Motions", Institute of Aerodynamics, Jul. 2017, pp. 1-22.
Shen, "Turbulent Flow over a Flexible Wall Undergoing a Streamwise Travelling Wave Motion", Jun. 10, 2003, J. Fluid Mech., vol. 484, pp. 197-221.
Symeonidis and Karniadakis, "Drag Reduction in Wall-Bound Turbulence Via a Transverse Travelling Wave", J. Fluid Mech., vol. 457, pp. 1-34.
Tamano, "Turbulent Drag Reduction due to Spanwise Traveling Waves with Wall Deformation", Nov. 20, 2014, FOR 1779 Symposium, pp. 1-51.
Tomiyama and Fukagata, "Direct Numerical Simulation of Drag Reduction in a Turbulent Channel Flow Using Spanwise Traveling Wave-like Wall Deformation", Oct. 2013, Physics of Fluids, vol. 25, pp. 1-22.
Tsao, "An Integrated MEMS System for Turbulent Boundary Layer Control", Jul. 1997, IEEE Solid State Sensors and Actuators, pp. 1-4.
Tsao, "Micromachined Magnetic Actuators for Active Fluid Control", 1994 International Mechanical Engineering Congress and Exposition, Dec. 1, 1994, pp. 31-38.
Van Buren and Amitay, "Piezoelectric Driven Oscillating Surface (PDOS)", RPI, 2014, 6 pages.
Viotti et al., "Streamwise Oscillation of Spanwise Velocity at the Wall of a Channel for Turbulent Drag Reduction", Oct. 2009, Physics of Fluids, vol. 21 , pp. 1-9.
Wang, "Flow over a Surface with Parallel Grooves", May 2003, vol. 15, No. 5, pp. 1114-1121.
Yang et al., "Micro Bellow Actuators", IEEE International Solid State Sensors and Actuators Conference, Jun. 19, 1997, pp. 1-4.
Zhao et al., "Turbulent Drag Reduction by Traveling Wave of Flexible Wall", Mar. 31, 2004, Fluid Dynamics Research, vol. 34, pp. 175-198.
Zhong et al., "Reduction of Pressure Losses in A Linear Cascade Using Herringbone Riblets", School of Mechanical, Aerospace and civil Engineering, University of Manchester, Aug. 17, 2017, 16 pages.
International Patent Application PCT/US2019/042832, International Search Report dated Nov. 4, 2019, 16 pp.

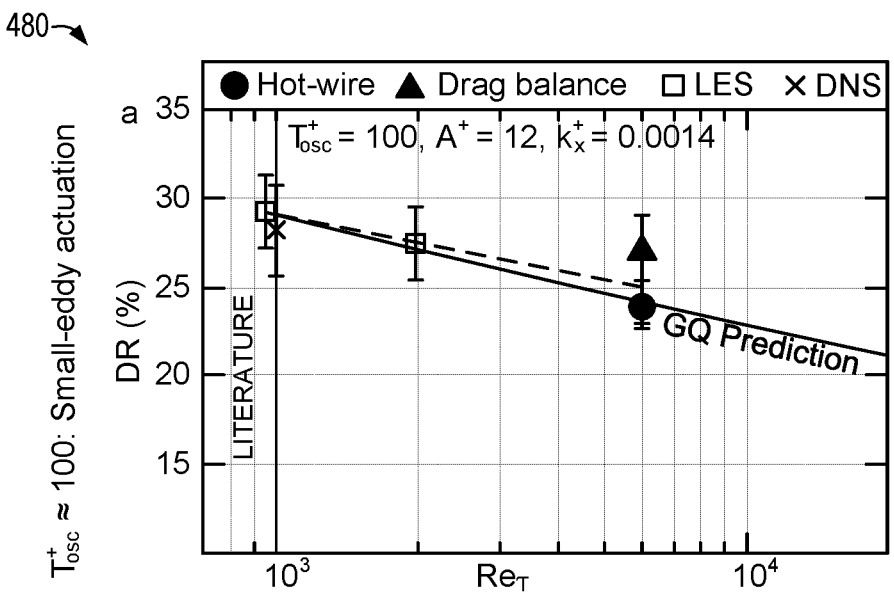
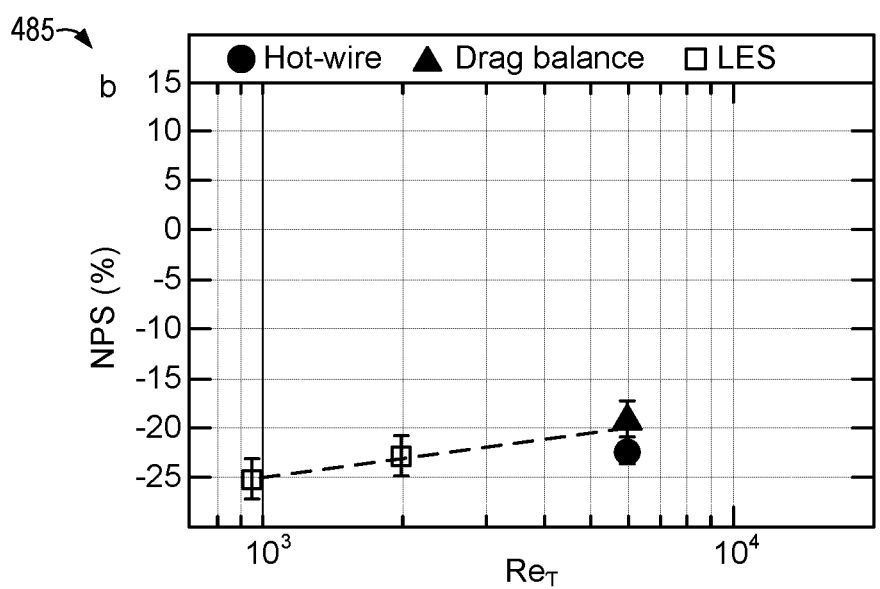
FIG. 4A

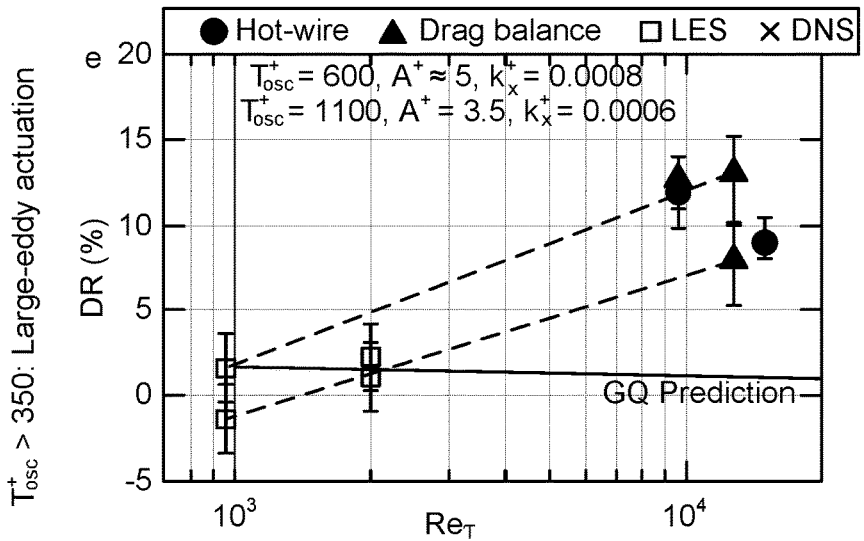
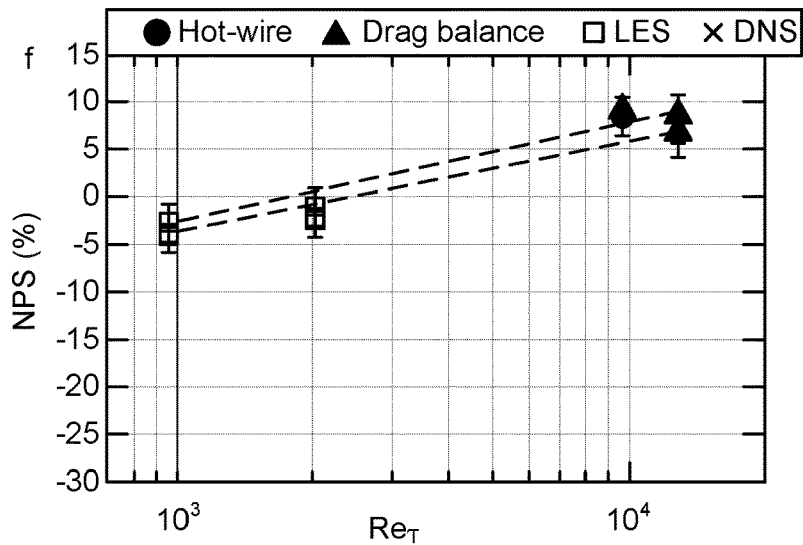
FIG. 4B

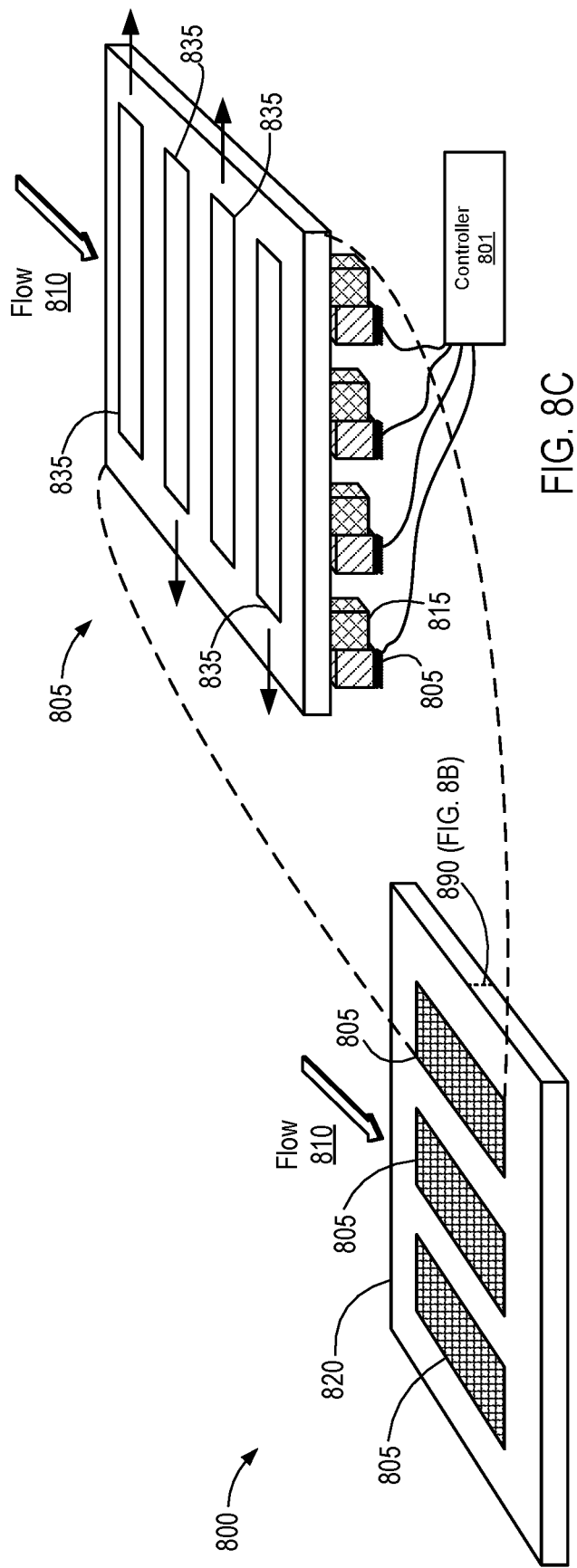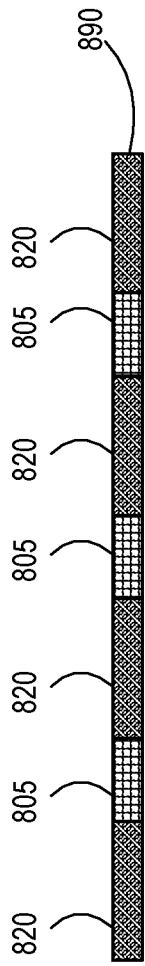

IN-PLANE TRANSVERSE MOMENTUM INJECTION TO DISRUPT LARGE-SCALE EDDIES IN A TURBULENT BOUNDARY LAYER

PRIORITY APPLICATIONS

This application is a continuation of U.S. patent application Ser. No. 17/673,535 filed on Feb. 16, 2022, entitled "In-Plane Transverse Momentum Injection to Disrupt Large-Scale Eddies in a Turbulent Boundary Layer," granting as U.S. Pat. No. 11,466,709 on Oct. 11, 2022, which claims benefit under 35 U.S.C. § 119 and priority to U.S. Provisional Patent Application No. 63/150,183 filed on Feb. 17, 2021, entitled "Drag Reduction Via Transverse Momentum Injection to Disrupt Large-Scale Eddies of a Turbulent Boundary Layer," and U.S. Provisional Patent Application No. 63/155,408 filed on Mar. 2, 2021, entitled "Turbulent Drag Reduction," each of which applications is hereby incorporated by reference in its entirety.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc. applications of the Priority Application(s)). In addition, the present application is related to the "Related Applications," if any, listed below.

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

The claimed invention relates to drag reduction in a turbulent boundary layer of a fluid flow on a surface of an object and the power savings related to such drag reduction. Drag is a dissipative force created by fluid moving relative to an object. For example, a fluid moving through a pipe experiences a dissipative force that acts against the wall of the pipe. Similarly, a vehicle (e.g., a car, an airplane, a jet, a rocket, a boat, a ship, etc.) moving through air or water experiences a resistant force that acts against the movement of the vehicle. One component of this force is skin friction drag, which is created when fluid at the surface stops, slows down, or changes direction. This creates a turbulent boundary layer. A turbulent boundary layer of the fluid interacting with the surface of an object creates small-scale eddies close to the surface, which develop into large-scale eddies extending farther from the surface.

The systems and methods described herein are applicable to situations in which a fluid is moving relative to a stationary object, a fluid is moving relative to a moving object, and an object is moving relative to a fluid. For example, an airplane may be described as moving through stationary or quasi-stationary air, even though the air is likely flowing with various currents (e.g., updrafts, downdrafts, wind, etc.). For the sake of brevity and clarity, some examples are described herein in the context of an object moving through a fluid. However, the corollary situations in which the fluid is, alternatively or additionally, moving relative to the object are also implied.

The turbulent boundary layer impedes the motion of the object relative to the fluid around it. Throughout this disclosure, the turbulent boundary layer is characterized as including small-scale eddies and large-scale eddies. The turbulent boundary layer may include irregular fluid flows in the form of rotational vortices, irrotational vortices, currents, eddies, and other turbulent flows. Turbulent flows in the turbulent boundary layer can be generally characterized as exhibiting fluctuations in pressure and flow velocity.

For purposes of this disclosure, the term 'small-scale eddy' is used to describe near-wall turbulent flows with viscous length scales on the order of $100\eta$ or less and time scales on the order of $100\eta'$ or less, as mathematically described in greater detail below. In contrast, the term 'large-scale eddy' is used herein to describe turbulent flows extending farther from the wall (and possibly not contacting the wall) that exist with time scales exceeding those of small-scale eddies. More specifically, a large-scale eddy is defined as having a time scale exceeding $300\eta'$.

The ratio of inertial forces to viscous forces within a fluid moving relative to an object is referred to as the Reynolds number (Re), which is a dimensionless value. Throughout this disclosure, the term "fluid" is used to describe gasses, liquids, and combinations thereof. The Reynolds number increases as the size of the object and/or the speed of the object increases relative to the fluid. The Reynolds number also increases as the fluid kinematic viscosity decreases. Accordingly, the Reynolds number associated with the flow of a liquid through a pipe increases as the flow speed increases. At a given velocity for a fluid flow, the Reynolds number is higher for fluids with relatively low kinematic viscosity and lower for fluids with relatively high kinematic viscosity. The same principles apply to the motion of objects through air and other gasses (e.g., the motion of airplanes, vehicles, turbine blades, projectiles, rockets, missiles, and the like), as well as the motion of liquids relative to an object (e.g., a submarine moving through water or oil moving through a pipe).

As a flow over a surface becomes turbulent, a turbulent boundary layer is formed between the surface of the object and the flow far away from the surface (where the relative velocity of the fluid is at its free-stream value $U_\infty$). The large-scale eddies and the small-scale eddies in the flow contribute to the skin friction drag that slows the flow of the fluid and/or the movement of the object through the fluid.

The local drag force acting on the surface (i.e., the "wall") per unit area is the wall stress, $\tau_w$. The wall stress has a time-average or mean value of $\overline{\tau_w}$ and a fluctuating value of $\tau'_w$.

As previously described, the turbulent boundary layer includes turbulent flows of various sizes that can be classified as small-scale eddies or large-scale eddies. The smallest eddies have a characteristic length scale given by $\eta = \nu/u_\tau$, where $\nu$ is the fluid kinematic viscosity and $u_\tau$ is the friction velocity. This is often called the viscous length scale. The friction velocity, $u_\tau$, can be expressed as $$u_\tau = \sqrt{\frac{\overline{\tau_w}}{\rho}},$$

where $\rho$ is the fluid density. The smallest eddies have a characteristic time scale $\eta'$, which is defined as $$\eta' = \frac{\eta}{u_\tau}.$$

Accordingly, the length scale, $\eta$, and the time scale, $\eta'$, of the smallest eddies can be characterized as:

$$\eta = \frac{\nu}{u_\tau} \quad \text{Equation 1}$$

$$\eta' = \frac{\nu}{u_\tau^2} \quad \text{Equation 2}$$

The largest eddies in the turbulent boundary layer have a characteristic length scale, $\eta_0$, equal to the boundary layer thickness, $\delta$, and a characteristic time scale, $\eta_0'$, equal to $\delta/U_\infty$. In many common instances relating to practical applications of the presently described systems and methods, the friction velocity, $u_\tau$, is approximately 20-40 times smaller than the free-stream value, $U_\infty$.

In a turbulent boundary layer, the friction Reynolds number, $Re_\tau$, represents the ratio of the viscous length scale of the largest eddies to the viscous length scale of the smallest eddies, and is thus expressible as:

$$Re_\tau = \frac{\delta u_\tau}{\nu} \quad \text{Equation 3}$$

Accordingly, the range of scale between the large-scale eddies and the small-scale eddies in a turbulent boundary layer increases as the friction Reynolds number, $Re_\tau$, increases. By way of example, the friction Reynolds number, $Re_\tau$, associated with the flow of air over an airplane fuselage may be 100,000, while the friction Reynolds number, $Re_\tau$, associated with a fluid flowing through a large pipeline may exceed 1,000,000. As the friction Reynolds number, $Re_\tau$, increases, the relative contribution of the large-scale eddies to the production of turbulence, and therefore drag, increases.

Attempts to reduce skin friction drag have focused on mitigating or modifying small-scale eddies in flows with friction Reynolds numbers, $Re_\tau$, less than 1,000. Some of these approaches are described in the following publications, each of which is hereby incorporated by reference in its entirety to the extent allowed by law and assumed to be understood by one of skill in the art: Batchelor, *An Introduction to Fluid Dynamics* (Cambridge Mathematical Library), Cambridge University Press (2000), doi:10.1017/CBO9780511800955; Gatti et al., *Reynolds-number dependence of turbulent skin friction drag reduction induced by spanwise forcing*, Journal of Fluid Mechanics (2016), vol. 802, pp. 553-582; Corke et al., *Active and Passive Turbulent Boundary layer Drag Reduction*, AIAA Journal (October 2018), Vol. 56, No. 10, pp. 3835-3847; Kline et al., *The structure of turbulent boundary layers*, Journal of Fluid Mechanics (1967), Vol. 30, pp. 741-773; Mathis et al., *Estimating wall-shear-stress fluctuations given an outer region input*, Journal of Fluid Mechanics (2013), Vol. 715, pp. 163-180; Marusic et al., *Predictive model for wall-bounded turbulent flow*, Science (2010), Vol. 329(5988), pp. 193-196; Panton, *Overview of the self-sustaining mechanisms of wall turbulence*, Prog. Aerosp. Sci. (2001), Vol. 37, pp. 341-383; Smith et al., *The characteristics of low-speed streaks in the near-wall region of a turbulent boundary layer*, Journal of Fluid Mechanics (1983), Vol. 129, pp. 27-54; Smits et al., *High Reynolds Number Wall Turbulence*, Annu. Rev. Fluid Mech. (2011), Vol. 43, pp. 353-375; Alfredsson et al., *Large-Eddy BreakUp Devices—a 40 Years Perspective from a Stockholm Horizon*, Flow Turbulence Combust (2018), Vol. 100, pp. 877-888; Garcia-Mayoral et al., *Drag reduction by riblets*, Phil. Trans. R. Soc. A (2011), Vol. 369, pp. 1412-1427; Schoppa et al., *A large-scale control strategy for drag reduction in turbulent boundary layers*, Physics of Fluids (May 1998); Vol. 10(5), pp. 1049-51; and Gouder, *Turbulent Friction Drag Reduction Using Electroactive Polymer Surfaces*, Doctoral thesis, Imperial College, May 2011. Additional references relating to drag reduction include U.S. Pat. No. 8,074,938 titled "Active control of a body by altering surface drag," by Hyde et al.; U.S. Pat. No. 8,074,939 titled "Active Control of Surface Drag," by Hyde et al.; and U.S. Pat. No. 9,002,484 titled "System and method for deforming surfaces," by Hyde et al., collectively referred to as "the Hyde Patents."

Some of the disclosures identified above suggest drag reduction techniques in which components on a surface, or portions of the surface, are moved up and down at high frequency to disrupt small-scale eddies. The up and down movement described in these disclosures is not parallel or co-planar to the surface. Moreover, the disclosures identified above suggest approaches for reducing drag in fluid flows by modifying small-scale eddies in flows with friction Reynolds numbers, $Re_\tau$, less than 1,000. Many of the publications identified above assume that the high frequencies required for small-scale eddy actuation at friction Reynolds numbers, $Re_\tau$, greater than 1,500 are mechanically infeasible, cost-prohibitive, and/or result in a net power loss. The general consensus has been that drag reduction cannot be attained with a net power savings in fluid flows at friction Reynolds numbers, $Re_\tau$, greater than approximately 1,500. Additionally, the research has been focused primarily on actuating small-scale eddies, with some publications even predicting that almost no drag reduction can be attained by large-scale eddy actuation.

The focus on small-scale eddy actuation and the assumption that large-scale eddy actuation is not suitable for attaining drag reduction is likely due to the lack of simulations of fluid flows having high friction Reynolds numbers, $Re_\tau$; that is, friction Reynolds numbers, $Re_\tau$, exceeding 1,500. The computing power required to simulate fluid flows grows nonlinearly as the friction Reynolds number, $Re_\tau$, increases, and so most simulations have been practically limited to fluid flows with friction Reynolds numbers, $Re_\tau$, less than 1,000. The simulations at these relatively low friction Reynolds numbers, $Re_\tau$, lead to the prediction (shown to be incorrect by the inventors of the invention claimed herein) that large-scale eddy actuation is not an effective approach to reduce drag.

Accordingly, the existing literature teaches away from large-scale eddy actuation and does not provide any practical solutions (e.g., that provide a net power savings) for reducing drag in fluid flows that have friction Reynolds numbers, $Re_\tau$, greater than approximately 1,500. The existing literature does not suggest, and in some instances even teaches away from, large-scale eddy actuation via the injection of momentum parallel to the surface and transverse to the direction of the fluid flow.

BRIEF DESCRIPTION OF THE DRAWINGS

FIG. 4A illustrates exemplary plots of drag reduction and net power savings for high-frequency actuation for small-scale eddy manipulation, according to one embodiment.

FIG. 4B illustrates exemplary plots of drag reduction and net power savings for low-frequency actuation for large-scale eddy manipulation, according to one embodiment.

FIG. 8A illustrates a simplified diagram of an adjustable friction surface with a plurality of electronically controlled dielectric elastomer actuators positioned within a structural surface, according to one embodiment.

FIG. 8B illustrates a cross-sectional view of the adjustable friction surface of FIG. 8A, according to one embodiment.

FIG. 8C illustrates a simplified diagram of a streamwise view of one of the electronically controlled dielectric elastomer actuators of FIG. 8A, according to one embodiment.

DETAILED DESCRIPTION

Figure 1A:
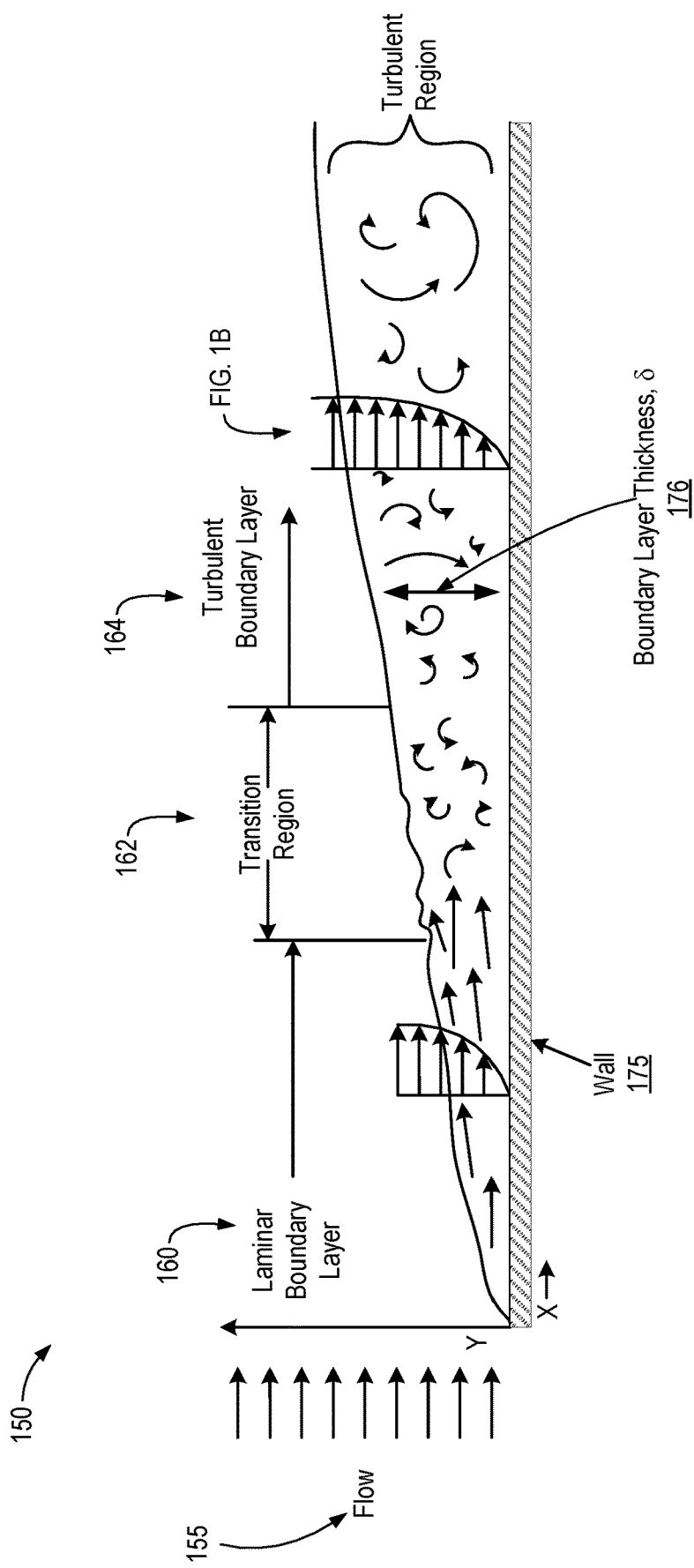
FIG. 1A illustrates an exemplary and simplified cross-sectional diagram of the development of a boundary layer.

As detailed above, existing publications predict that while drag reduction is possible, net power savings cannot be achieved using high-frequency actuation at friction Reynolds numbers, $Re_\tau$, exceeding 1,000. Furthermore, the spatial frequency and the temporal frequency of the momentum injection needed for increased or optimal drag reduction will increase as the friction Reynolds number, $Re_\tau$, increases. Therefore, at higher friction Reynolds numbers, $Re_\tau$, (e.g., above 1,500 and especially above 5,000 where many practical applications operate), it is impractical, difficult, or impossible with existing technologies to operate a momentum injection system at the high spatial and temporal frequencies necessary for direct modification of the small-scale eddies. Therefore, based on both theoretical and practical considerations, a different approach to transverse momentum injection is needed if net power savings is to be accomplished at commercial flow speeds and $Re_\tau$. The presently described systems and methods propose a new approach in which low-frequency transverse actuation is used to modify large-scale eddies to obtain net power savings.

The experiments described in U.S. Provisional Patent Application No. 63/155,408, titled "Turbulent Drag Reduction," to which this application claims priority, demonstrate that efficient drag reduction (e.g., providing a net power savings) can be obtained in fluid flows that have high friction Reynolds numbers, $Re_\tau$, (e.g., greater than approximately 1,500). The experiments found that significant drag reduction was attainable in fluid flows with high friction Reynolds numbers through large-scale eddy actuation via the injection of momentum parallel to a surface and transverse to the flow of the fluid. This disclosure provides various systems and methods for controlling drag (e.g., reducing or increasing) in fluid flows that have friction Reynolds numbers, $Re_\tau$, exceeding 1,500 via large-scale eddy actuation.

The presently described systems and methods are applicable to a wide variety of fluids and surfaces that are in motion relative to one another. Examples of surfaces that may utilize the systems and methods described herein include, but are not limited to, fixed-wing aircrafts, rotary-wing aircrafts, rockets, missiles, projectiles, and the like. Additional examples include, but are again not limited to, various surfaces of a pipe, a pump, a fan, a turbine, a wind turbine, a mast, an airfoil, a hydrofoil, a sail, a boat rudder, a boat hull, a rocket nozzle, and a land vehicle.

The systems and method described herein may also be utilized to decrease or selectively increase friction within pipes or fluid vessels that operate to transport fluids, mix fluids, transfer heat from fluids, or manage chemical reactions of fluids. Examples of fluids for which in-plane, transverse momentum injection may decrease (or selectively increase) friction include, but are not limited to, air, water, gaseous mixtures, natural gas, various liquids, oil, and the like.

As described in greater detail below, a controller may control the actuation of any number of actuators, and multiple controllers and associated sets of actuators may operate in concert to achieve a target friction profile, friction reduction, or friction increase along one or more surfaces of an object that is in motion with respect to a fluid and/or a fluid that is in motion with respect to the object. Examples of suitable actuators that can be used to inject transverse momentum into the turbulent boundary layer in-plane with respect to the surface and at low frequencies to disrupt the large-scale eddies include, but are not limited to, piezoelectric actuators, electromagnetic actuators, electromechanical actuators, and dielectric-barrier discharge (DBD) devices.

For example, a controller may operate or actuate a plurality of actuators according to an actuation frequency, f, in Hz so that the period of the motion is given by T=1/f, and the angular frequency ω is defined as ω=2πf rad/s. In terms of the viscous time scale, $\eta'$, the period T can be expressed as a non-dimensional period, $T^+$, (also referred to as a time-scale multiplier) defined as $$T^+ = \frac{1}{f\eta'}.$$

For any given $Re_\tau$, $\eta'$ is constant. Recall, that small-scale eddies have time scales on the order of $100\eta'$. Thus, when the controller is set to operate with a $T^+$ in the order of 100, the actuation period (T) is similar to the timescale of (and therefore actuates) the small-scale eddies in the flow. Similarly, because large-scale eddies have time scales exceeding $300\eta'$, when the controller is set to operate with a $T^+$ of more than 300, the actuation period (T) is similar to the timescale of (and therefore actuates) the large-scale eddies in the flow.

The controller may identify the specific fluid flow characteristics of a turbulent boundary layer of the fluid. For example, the controller may be pre-programmed with specific data or use sensor data (e.g., in real-time) to measure characteristics of the fluid flow. Examples of fluid flow characteristics to be obtained from memory, a third-party server, or via sensor measurements include, but are not limited to, a mean or bulk velocity, U, a friction velocity, $u_\tau$, of the fluid, a kinematic viscosity, $\nu$, of the fluid, and friction Reynolds numbers, $Re_\tau$, of the fluid.

The controller may calculate an actuation frequency, f, for transverse momentum injection along the surface (e.g., for in-plane momentum injection co-planar with the surface). The actuator frequency, f, may be selected to disrupt large-scale eddies in the turbulent boundary layer. Again, the terms "large-scale" and "small-scale" are used as descriptors to distinguish between two types of eddies in a turbulent boundary layer.

The controller may actuate the plurality of actuators on the surface of the object using the calculated or determined actuation frequency, f, to disrupt the large-scale eddies to selectively increase (or decrease) the drag of the fluid on the surface of the object. The actuation frequency, f, is selected based on the time scale multiplier, $T^+$, that is at least 300, such that the low-frequency actuation disrupts large-scale eddies, as described herein. Alternatively, if the actuation frequency is known, the time scale multiplier, $T^+$, is a function of the identified friction velocity squared, $u_\tau^2$, divided by the product of (i) the calculated actuation frequency, f, and (ii) the identified kinematic viscosity, $\nu$. Thus, the time scale multiplier, $T^+$, is expressible as:

$$\frac{1}{T^+} = \frac{f*\nu}{u_\tau^2}. \qquad \text{Equation 4}$$

As an example, the controller may actuate the actuators on a time scale multiplier, $T^+$, that is greater than 300 for fluid flows having friction Reynolds numbers, $Re_\tau$, greater than 1,500. According to various embodiments, the actuation frequency, f, is less than 20,000 Hz for friction Reynolds numbers, $Re_\tau$, greater than 1,500. In various embodiments, the systems and methods described herein may be utilized to create an adjustable friction surface. The adjustable friction surface may include one or more actuators (e.g., a plurality of actuators) positioned on a surface (e.g., extending slightly from the surface, co-planar with the surface, and/or recessed slightly beneath the surface). A controller may selectively increase or decrease the skin friction of a fluid flow by selectively actuating the actuators according to the principles described herein. Many existing computing devices and infrastructures may be used in combination with the presently described systems and methods. Some of the infrastructure that can be used with embodiments disclosed herein is already available, such as processors, microprocessors, microcontrollers, computer programming tools and techniques, digital storage media, and communication links.

Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific function.

It is also appreciated that two or more of the systems, subsystems, components, modules, etc. that are described herein may be combined as a single system, subsystem, module, or component. Moreover, many of the systems, subsystems, components, and modules may be duplicated or further divided into discrete systems, subsystems, components, or modules to perform subtasks of those described herein. Any of the embodiments described herein may be combined with any combination of other embodiments described herein. Many of the embodiments of the systems and methods described herein that appear to be mutually exclusive may be used in combination as weighted functions of one another and/or in primary-backup configurations in which one embodiment is used primarily, and the other embodiment is available as a backup.

As used herein, a computing device, system, subsystem, module, or controller may include a processor, such as a microprocessor, a microcontroller, logic circuitry, or the like. A processor may include one or more special-purpose processing devices, such as an application-specific integrated circuit (ASIC), a programmable array logic (PAL) device, a programmable logic array (PLA), a programmable logic device (PLD), field-programmable gate array (FPGA), or another customizable and/or programmable device. The computing device or controller may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of some of the disclosed embodiments are described and illustrated in the figures herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As described above, descriptions and variations described in terms of transmitters are equally applicable to receivers, and vice versa.

FIG. 1A illustrates a simplified diagram 150 of the development of a boundary layer, according to one embodiment. As illustrated, a fluid flow initially interacts with a wall 175 as a laminar boundary layer 160. As air or other fluid molecule collisions increase, the fluid flow transitions within a transition region 162 into a turbulent boundary layer 164 with a boundary layer thickness, $\delta$, 176. The turbulent boundary layer 164 includes large-scale and small-scale eddies, as described herein. The boundary layer thickness, $\delta$, 176 of the turbulent boundary layer 164 may be a function of the characteristics of the wall 175, the velocity of the fluid flow relative to the wall 175, and the characteristics of the fluid flow, among other parameters.

Figure 1B:
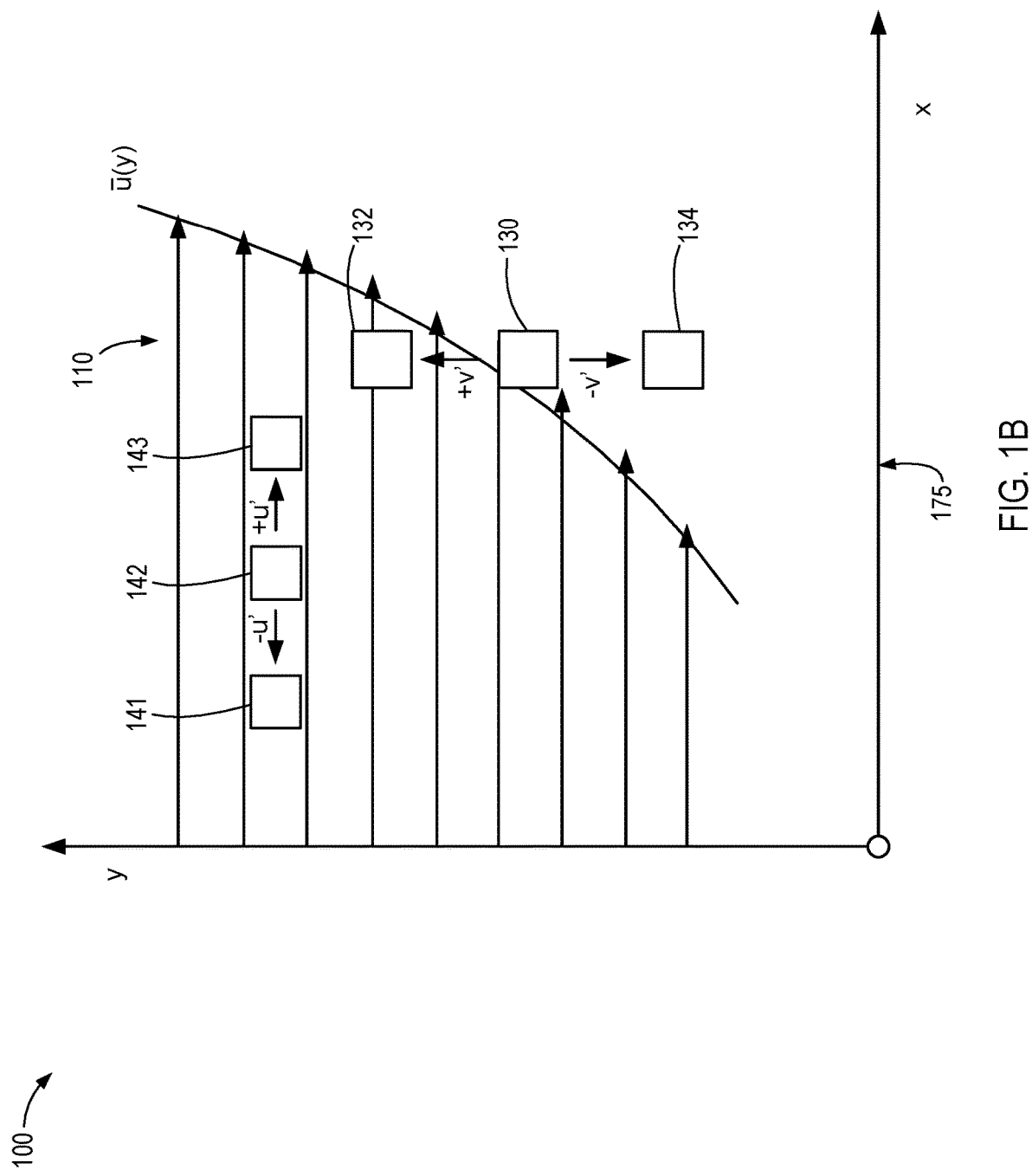
FIG. 1B illustrates an exemplary diagram of mixing in a turbulent boundary layer, according to one embodiment.

FIG. 1B illustrates an example diagram 100 of a mean velocity profile, $\bar{u}(y)$, of a turbulent boundary layer of a fluid 110 against a wall 175, according to one embodiment. The streamwise velocity (u) of the fluid 110 is along the x-axis with fluid parcels moving from locations 141, to 142, to 143. The direction away from the wall 175 is defined along the y-axis (e.g., perpendicular to the surface of the object over which the fluid 110 is flowing). The wall-normal (y) component of the fluctuation in velocity is denoted by v. The mean values of the velocity components are $\bar{u}$ and $\bar{v}$ in the x- and y-directions, respectively.

The contribution of turbulence to the drag on the surface of the wall 175 is, at least in part, dependent upon mixing. For example, turbulent motions in the fluid 110 tend to homogenize flow properties such as momentum and heat, and thereby reduce bulk temperature and velocity gradients. This can be observed in turbulent boundary layers where the velocity gradients in the outer part of the boundary layer are small. However, the turbulent motions lead to very strong velocity gradients within a thin layer near the surface of the wall 175 since the velocity must obey a no-slip condition at the wall 175 (assuming the wall 175 is impermeable). Accordingly, a turbulent boundary layer of the fluid 110 proximate the wall 175 exhibits a higher skin friction drag than a laminar flow drag at the same free-stream velocity.

In terms of the turbulent velocity fluctuations, the wall-normal component, v, is fundamental to the mixing process. A parcel of fluid 110 (e.g., a volume, a molecule, etc.) that moves from a lower location (e.g., location 130) on the mean velocity profile, $\bar{u}(y)$, to a higher location (e.g., location 132) on the mean velocity profile, $\bar{u}(y)$, has a positive fluctuation in velocity, v, and a negative fluctuation in velocity, u, as compared to neighboring parcels of the fluid 110. In instances where the x-momentum of the parcel is conserved until it mixes upon arrival at the new location, the local value of the streamwise momentum is reduced.

Similarly, a parcel of the fluid 110 that moves from a higher location (e.g., location 130) on the mean velocity profile, $\bar{u}(y)$, to a lower location (e.g., location 134) on the mean velocity profile, $\bar{u}(y)$, has a negative fluctuation in velocity, v, and a positive fluctuation in velocity, u, as compared to neighboring parcels of the fluid 110. Upon mixing, the parcel of the fluid 110 will increase the local value of the streamwise momentum. Wall-normal motions, therefore, tend to reduce velocity differences. Accordingly, momentum flux (i.e., when the kinematic Reynolds shear stress is equal to $-\overline{uv}$)), and consequently the velocity gradients near the wall 175 and associated drag, can be reduced by inhibiting the wall-normal motion of the fluid 110. The mean Reynolds shear stress is positive, such that $-\overline{uv} > 0$.

As provided by the Navier-Stokes equation, the total rate of change of momentum at any point near the wall 175 (approximately y/delta<0.15) in a zero-pressure gradient boundary layer that can be estimated by Equation 5 below:

$$\partial(-\overline{uv} + v\partial U/\partial y)/\partial y = 0 \qquad \text{Equation 5}$$

The total stress is expressed by the term in parentheses in Equation 5. By integration, we see that near the wall 175, the total stress is constant, and at the wall 175 where y=0 and v=0, the total stress is equal to the wall shear stress, $\tau_\omega$.

For approximately y/delta<0.15, the wall shear stress, can be estimated using Equation 6 below:

$$\tau_\omega = (\nu \partial U/\partial y)_{y=0} = -\overline{uv} + \nu(\partial U/\partial y) \qquad \text{Equation 6}$$

Accordingly, the total stress includes the turbulent part associated with $-\overline{uv}$ and the viscous part associated with the mean velocity gradient. Very close to the wall 175, v is approximately 0 because the wall 175 is impermeable, and the viscous part dominates. However, farther away from the wall, the turbulent component of the fluid 110 increasingly becomes the dominant component governing the momentum transport.

Figure 1C:
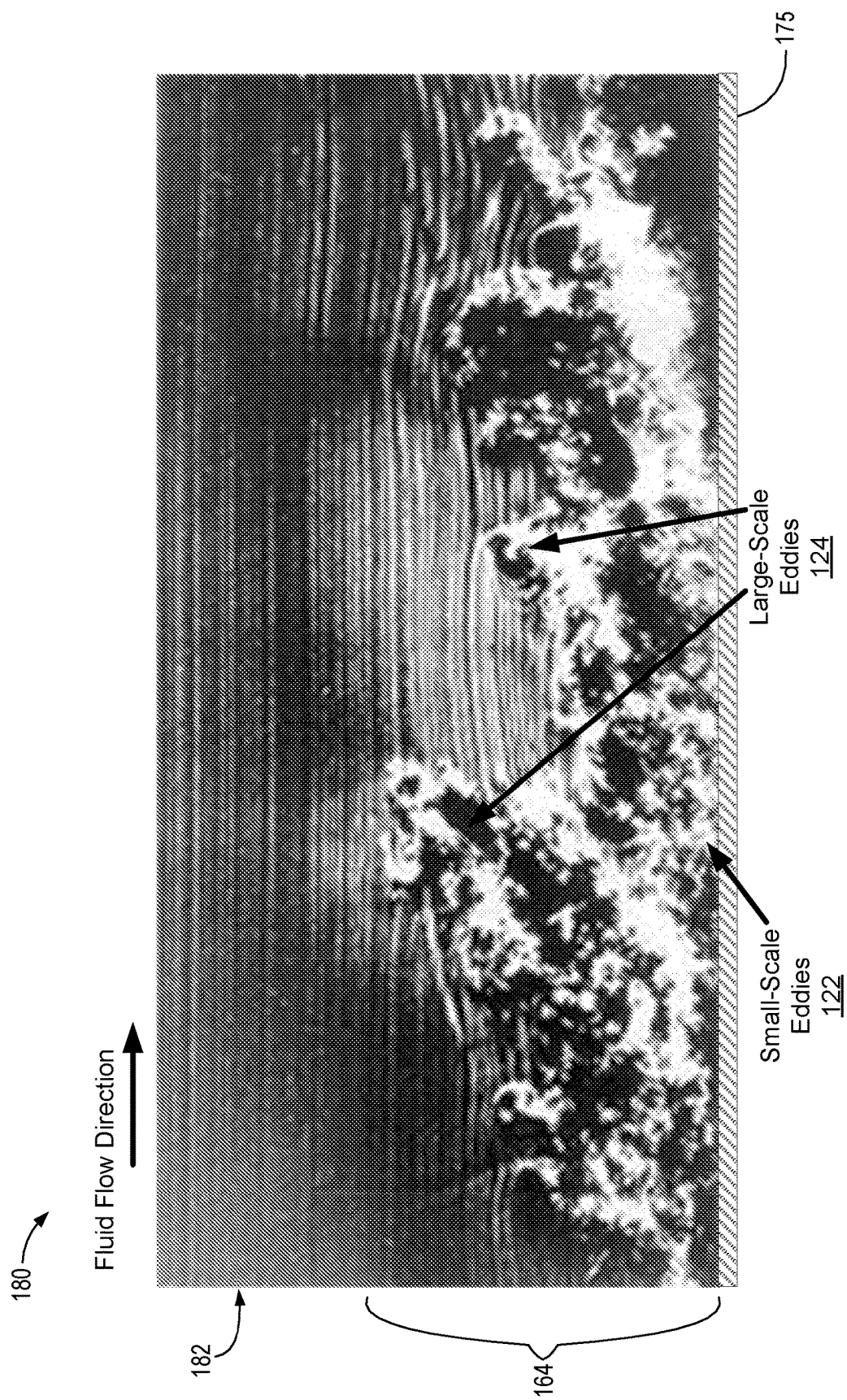
FIG. 1C illustrates a simplified diagram of the turbulent boundary layer of a fluid flow on a wall, including small-scale eddies and large-scale eddies, according to one embodiment.

FIG. 1C illustrates a simplified diagram 180 of a turbulent boundary layer 164 of a fluid flow on or proximate the wall 175, according to one embodiment. As illustrated, the fluid flow includes an undisturbed bulk flow 182 above the turbulent boundary layer 164. The turbulent boundary layer 164 includes small-scale eddies 122 and large-scale eddies 124. As described herein, one way to modify the small-scale eddies 122 is to modify the fluid flow near the wall 175 in the transverse, or spanwise, direction. Drag can be affected by injecting momentum into the fluid flow by moving the wall 175. The transverse or spanwise injection of momentum that is parallel or co-planar with the surface of the wall 175 is referred to herein as transverse momentum injection (e.g., into and out of the page of the illustrated diagram 180).

The presently described systems and methods relate to transverse momentum injection that, as previously stated, is transverse or spanwise relative to the fluid flow direction and along the surface of the wall 175. While the surface of the wall 175 may be curved or otherwise non-planar, the transverse momentum injection is still described herein as being "co-planar" or "parallel" in the sense that the momentum is injected along the surface spanwise to the direction of the fluid flow.

Figure 2A:
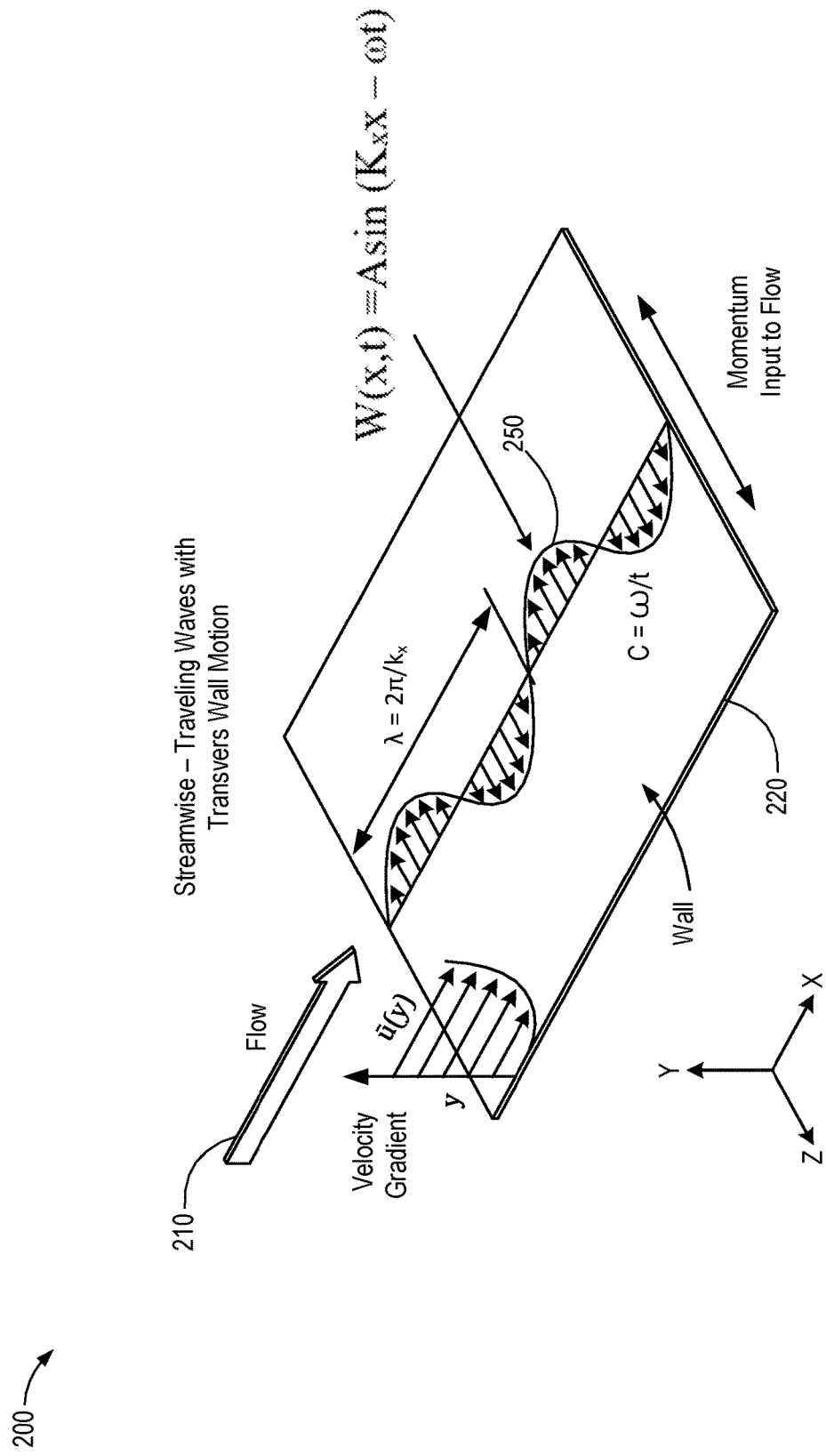
FIG. 2A illustrates a simplified diagram of in-plane, transverse momentum injection into the turbulent boundary layer, according to one embodiment.

FIG. 2A illustrates a simplified diagram 200 of in-plane, transverse momentum injection, according to one embodiment. The idealized oscillation of the fluid flow 210 at the wall 220 is shown by the wavy line 250 superimposed on the turbulent fluid flow 210 at the wall 220. The oscillation is shown as sinusoidal for convenience, but any periodic function can be used. For a sinusoidal oscillation, the motion is prescribed by:

$$W(x,t) = A \sin(K_x x - \omega t) \qquad \text{Equation 7}$$

In Equation 7, "W" is the transverse velocity, "A" is the transverse velocity magnitude, "$K_x$" is the wavenumber in the x-direction (inversely proportional to wavelength $\lambda$) and $\omega$ is the angular frequency. The non-dimensional time scale multiplier, $T^+$, and the non-dimensional length scale, $\lambda^+$, relate the physical variables, such as the wavelength, $\lambda$, and the angular frequency, $\omega$, to the fluid properties. The fluid motion can be implemented in various ways, but the "A" and "$\omega$" parameters are chosen based on the calculation of time scale multiplier using eta-prime ($\eta'$) and $T^+$ values calculated using, for example, Equation 2 and Equation 4 above. In a similar way, the non-dimensional length scale, $\lambda^+$, is defined as $\lambda^+ = \lambda/\eta$, which can also be used to choose a wavelength $\lambda$ that affects the large-scale eddies. These non-dimensional scales thus facilitate comparisons of different flows and actuation mechanisms.

The systems and methods herein provide approaches to reduce the mixing action caused by large-scale eddies; that is, eddies that have characteristic time scales exceeding 300 $\eta'$. The systems, mechanical components, spacings, controllers, and functionality of the various components used to modify large-scale eddies are different from those used to impact small-scale eddies.

Existing approaches that utilize momentum injection have focused on direct modification of the small-scale eddies in fluid flows that have a relatively low friction Reynolds number, $Re_\tau$, (e.g., where $Re_\tau$ is less than approximately 1,000). For fluid flows having relatively low friction Reynolds number, $Re_\tau$, the momentum is injected at very high spatial and temporal frequencies to directly affect the small-scale eddies. The injection of momentum at high spatial and temporal frequencies requires significant power to "pump" or otherwise move the fluid transversely and results in no net power savings and possibly even a net power loss. Additionally, the publications identified above suggest, and in some cases predict or model, that drag reduction decreases significantly when actuation is performed below an assumed optimum time scale multiplier, $T^+$, of about 100.

Figure 2B:
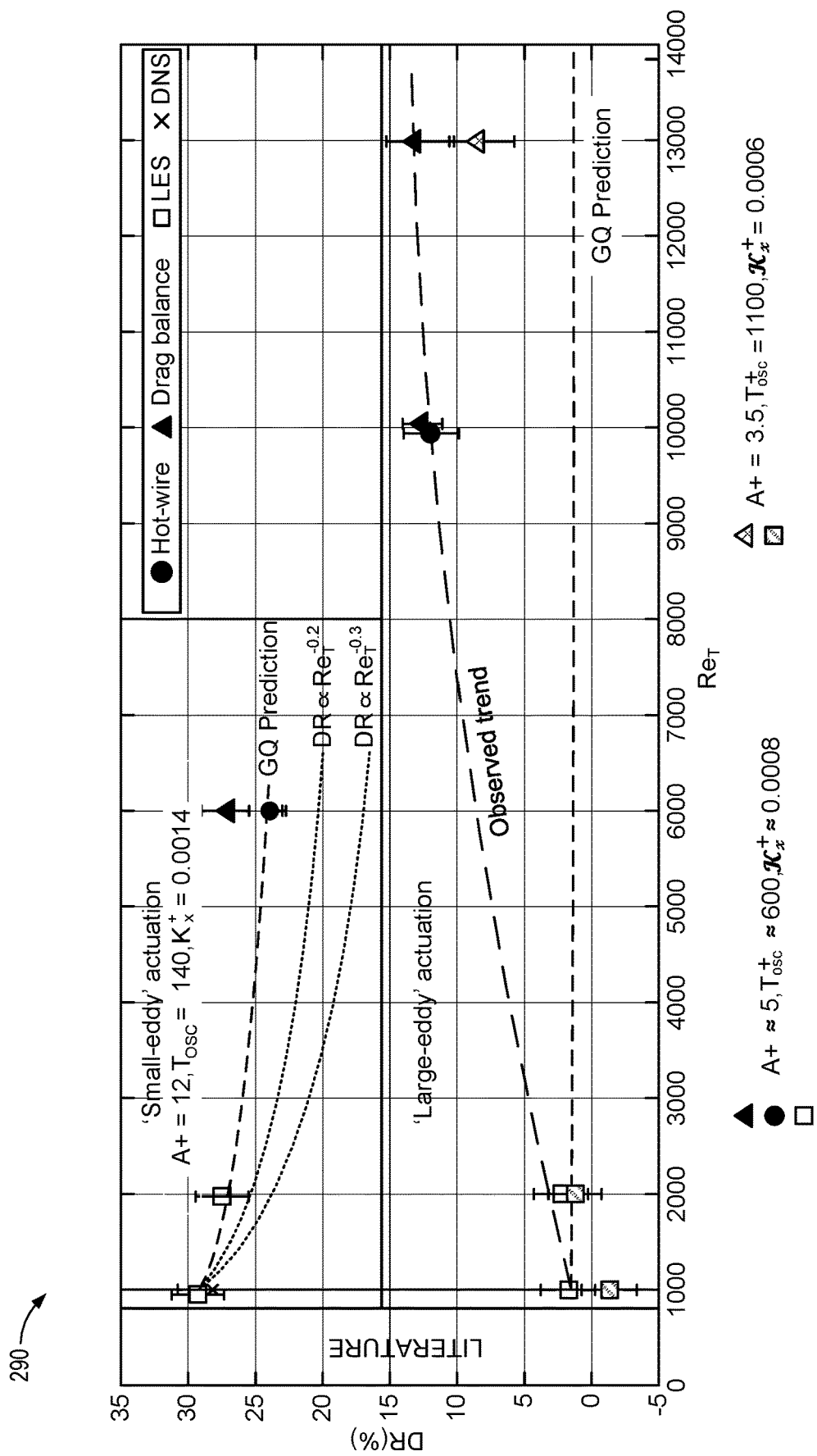
FIG. 2B illustrates a graph of drag reduction relative to friction Reynolds numbers, $Re_\tau$, for small-scale eddy actuation and large-scale eddy actuation, according to various embodiments.

FIG. 2B illustrates a graph of example plots 290 of drag reduction relative to friction Reynolds numbers, $Re_\tau$, for small-scale eddy actuation (upper left corner) and large-scale eddy actuation (lower half), according to various embodiments. The example plots 290 are the result of experimental measurements of drag reduction induced by electromechanical surface actuation of 48 slats on a surface that are sinusoidally moved in the spanwise direction relative to a streamwise fluid flow. The exact specifications and results of the experiment are described in U.S. Provisional Patent Application No. 63/155,408, titled "Turbulent Drag Reduction," to which this application claims priority. As noted therein, large-scale eddy simulations (LES) are included in the example plots as open squares, but are limited to friction Reynolds numbers, $Re_\tau$, of less than 2000 due to computing resource limitations. Based on large-scale eddy simulations similar to those in the example plots 290, a lower dashed line labeled "GQ Prediction" represents the erroneous prediction of the efficacy of large-scale eddy actuations made in the Gatti publication cited above. This erroneous prediction gave rise to an erroneous expectation of almost no drag reduction attained via large-scale eddy actuation.

The presently described systems and methods have been simulated and modeled via oscillatory surface actuation in a wind tunnel with friction Reynolds numbers, $Re_\tau$, between 6,000 and 13,000, as detailed in the provisional patent application(s) to which this application claims priority. The drag reduction accomplished via in-plane transverse momentum injection to disrupt large-scale eddies was measured directly via a large-scale drag balance (triangles) and indirectly via a hot-wire anemometer (circles). As illustrated, and contrary to earlier predictions, large-scale eddy actuation results in increased drag reduction as the friction Reynolds number, $Re_\tau$, increases.

Figure 3:
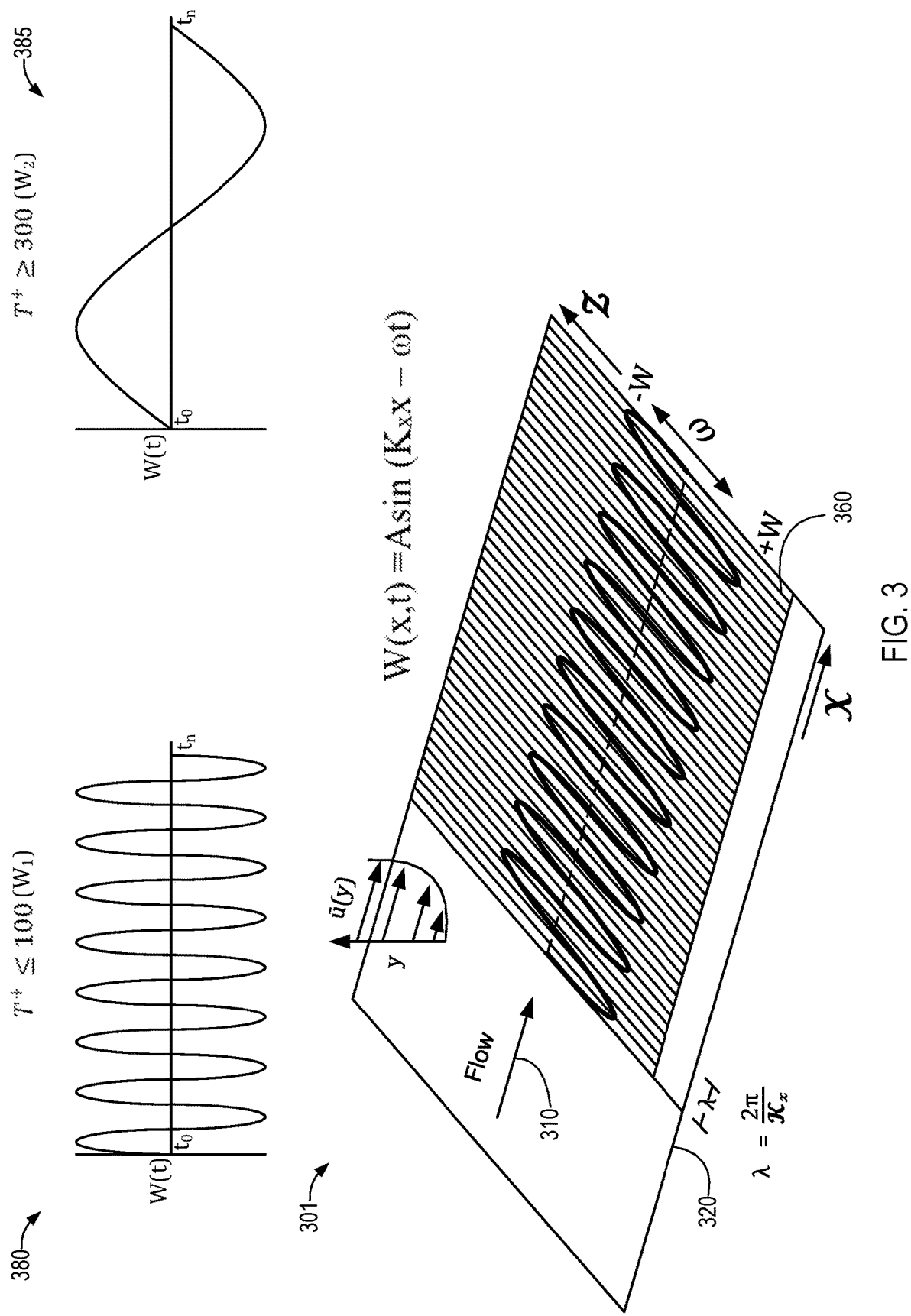
FIG. 3 illustrates a simplified diagram of in-plane, transverse momentum injection, according to one embodiment.

FIG. 3 illustrates a simplified diagram 301 of in-plane, transverse momentum injection with respect to a fluid flow 310 over a surface 320, according to one embodiment. The illustration graphically depicts the motion in space of numerous surface actuators 360 (illustrated as 48 moveable plates). The surface actuators 360 oscillate to inject momentum transverse to the fluid flow 310 and co-planar to the surface 320. The graph 380 of $W_1$ with respect to time, t, from $t_0$ to $t_n$ illustrates the relatively fast motion of the surface actuators 360 based on a $T^+ \leq 100$, per Equation 7 above. The relatively fast motion of the surface actuators based on a $T^+ \leq 100$ results in transverse momentum injection that affects the small-scale eddies in the turbulent boundary layer of the fluid flow 310 over the surface 320.

In contrast, the graph 385 of $W_2$ with respect to time, t, from $t_0$ to $t_n$ illustrates the relatively slow motion of the surface actuators 360 based on a $T^+ \geq 300$. The relatively slow motion of the surface actuators based on a $T^+ \geq 300$ results in transverse momentum injection that affects the large-scale eddies in the turbulent boundary layer of the fluid flow 310 over the surface 320.

FIG. 4A illustrates example plots 480 and 485 of drag reduction and net power savings, respectively, for the high-frequency actuation of the system in FIG. 3 based on a $T^+ \leq 100$. As illustrated in the drag reduction plot 480, if the mechanism in FIG. 3 is driven at a $T^+$ of 100 or less (i.e., at high temporal frequencies) then the transverse injection of momentum will directly affect the small-scale eddies, leading to significant drag reduction. However, as illustrated in the net power savings (NPS) plot 485, the large power requirements for high-frequency spatial and temporal actuation lead to negative net power savings or increased overall power consumption. The overall power consumption improves somewhat as the friction Reynolds number, $Re_\tau$, increases but remains larger than it would be without actuation (i.e., the net power savings remains negative).

FIG. 4B illustrates example plots 490 and 495 of drag reduction and net power savings, respectively, for the low-frequency actuation and large-scale eddy manipulation provided by the system of FIG. 3, according to one embodiment. In the illustrated plots 490 and 495, the electromechanical actuation system of FIG. 3 is driven at a $T^+$ of 300 or greater (i.e., at low temporal frequencies). At relatively low $Re_\tau$, the drag reduction is lower or even negative, and the net power savings is also negative. However, contrary to the predictions in the existing literature, as $Re_\tau$ increases, the drag reduction increases, leading to positive net power savings that increase with the $Re_\tau$, in this case on the order of 5-10%. Accordingly, transverse momentum injection to affect large-scale eddies can be more effective for drag reduction on a net-power basis in many instances, especially those involving friction Reynolds numbers, $Re_\tau$, in excess of approximately 1,500. Additionally, as the friction Reynolds number, $Re_\tau$, increases, the ability to manipulate (increase or decrease) drag is maintained due to the low spatial and temporal frequencies required.

As is apparent via a comparison of FIG. 4A and FIG. 4B, for friction Reynolds numbers, $Re_\tau$, less than approximately 1,000, high-frequency actuation may reduce drag, but results in a negative net power savings. For friction Reynolds numbers, $Re_\tau$, greater than approximately 1,000, high-frequency actuation provides diminishing drag reduction and continues to have a negative net power savings. In contrast, low-frequency actuation provides a net power savings and appreciable drag reduction at friction Reynolds numbers, $Re_\tau$, greater than approximately 1,500. As described herein, low-frequency actuation can be accomplished using electronically controlled actuators for transverse momentum injection along the surface at frequencies selected to affect large-scale eddies. Various actuators and configurations of actuators are described herein to facilitate transverse momentum injection including, without limitation, fluid jet actuators that emit fluid from small holes or openings, DBD actuators, piezoelectric actuators, electromagnetic actuators, electro-mechanical actuators, and/or micro-electro-mechanical system actuators (MEMS actuators).

A transverse momentum injection system for low-frequency modification of large-scale eddies (e.g., those characterized as having time scales exceeding $300\eta'$) may be incorporated into one or more surfaces of an aircraft (e.g., fuselage, wings, empennage, etc.), the blades or mast of a wind turbine, an airfoil, a hull of a ship, a control surface of a ship (e.g., a rudder), a ground-based vehicle (e.g., a train, a car, a truck, a bus, etc.), rockets, turbine blades, interior and exterior nacelle surfaces, exhaust cone surfaces, interior surfaces of heating and cooling system components (e.g., ductwork of HVAC systems), the interior of pipes and valves, and/or any of a wide variety of other surfaces that come into contact with any of a wide variety of fluids. Additional uses for transverse momentum injection systems configured to modify large-scale eddies in the turbulent boundary layer include fluid vessels for chemical reactions, fluid vessels for mixing, heat transfer fluid vessels, pipes, pumps, fans, turbine engines and fans, rocket nozzles, and the like.

While many of the embodiments and examples described herein relate specifically to reducing drag, the same principles and approaches can be operated in reverse to increase drag when warranted. As previously noted, in contrast to momentum injection approaches for affecting small-scale eddies, the systems and methods described herein implement transverse momentum injection along the surface (e.g., in-plane with respect to the surface or co-planar to the surface) at low actuation frequencies. For example, a transverse momentum injection system configured to modify and affect large-scale eddies may operate at a frequency between 10 Hertz and 10,000 Hertz.

According to various embodiments, a transverse momentum injection system includes a plurality of electronically controlled actuators on the surface of an object to modify large-scale eddies at time scale multipliers, $T^+$, that are greater than 300 (i.e., $T^+>300$) for fluid flows having any friction Reynolds number, $Re_\tau$. In some embodiments, a transverse momentum injection system to affect large-scale eddies via transverse momentum injection may operate at time scale multipliers, $T^+$, that are greater than 300 in situations in which the friction Reynolds number, $Re_\tau$, exceeds 1,500.

In some embodiments, a transverse momentum injection system may be specifically configured to affect large-scale eddies in turbulent boundary layers where the streamwise length scale, $L_0^+$, defined as $$\frac{U_\infty}{f \cdot \delta},$$

is between 0.2 and 20. Specific embodiments of a transverse momentum injection system that are designed and adapted to affect large-scale eddies in turbulent boundary layers may be configured to operate with a streamwise actuation wavelength greater than 10 mm. In some embodiments, the transverse actuation velocity may be between 1% and 20% of free-stream velocity. In various embodiments, the transverse wavelength spacing between actuators in the transverse direction may be between $\delta/10$ and $\delta/2$.

Figures 5A, 5B, 5C:
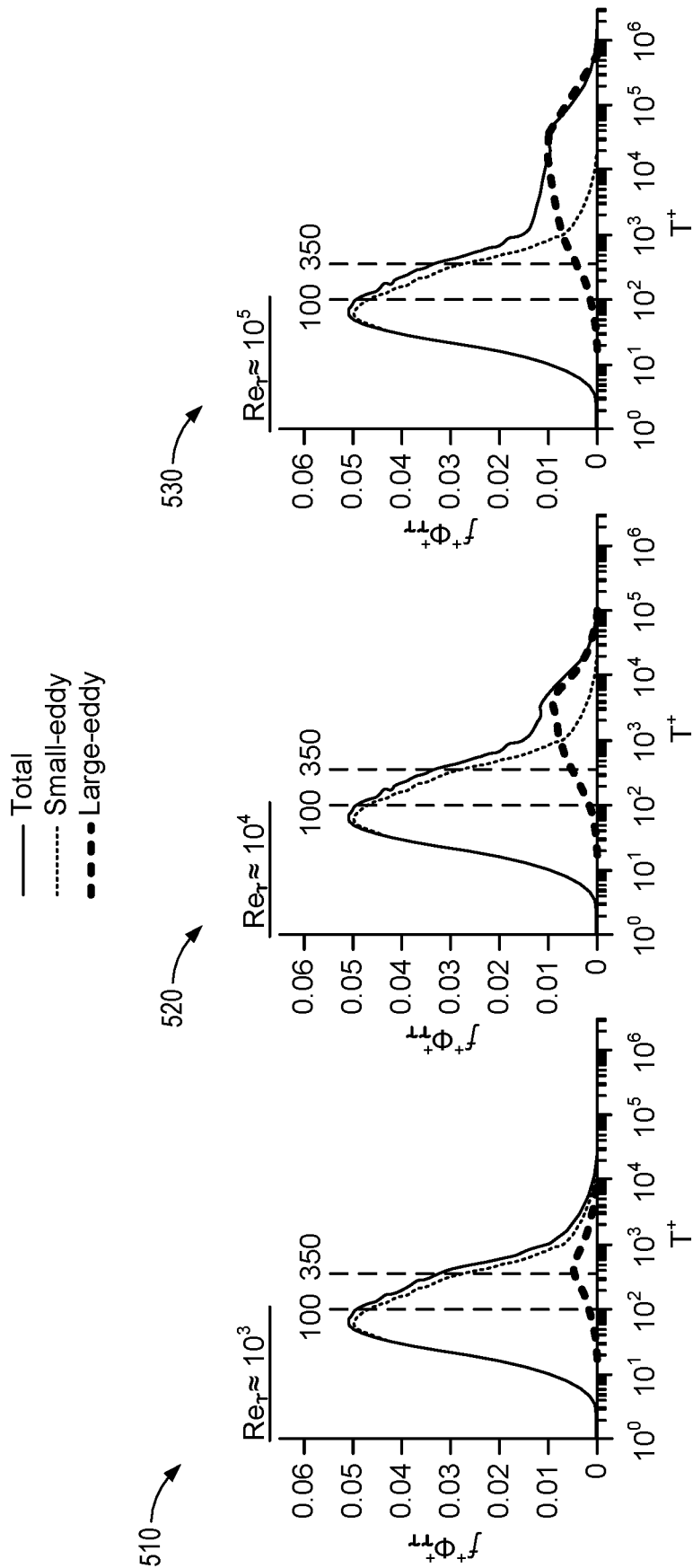
FIGS. 5A-C illustrate exemplary graphs of the relative amounts of turbulent wall stress (y-axis) with increasing $T^+$ for small-scale eddies and large-scale eddies at different friction Reynolds numbers in turbulent boundary-layer flows, according to various embodiments.

FIGS. 5A-C illustrate example graphs 510, 520, and 530 of the relative amounts of turbulent wall stress (y-axis) with increasing $T^+$ for small-scale eddies and large-scale eddies in un-actuated turbulent boundary-layer flows at various friction Reynolds numbers, $Re_\tau$, according to various embodiments. As such, the $T^+$ in FIGS. 5A-C refers to the timescale of the eddies in the un-actuated flow.

FIG. 5A illustrates a graph 510 of the relative amounts of wall stress at a friction Reynolds number, $Re_\tau$, of approximately 1,000. FIG. 5B illustrates a graph 520 of the relative amounts of wall stress at a friction Reynolds number, $Re_\tau$, of approximately 10,000. FIG. 5C illustrates a graph 530 of the relative amounts of wall stress at a friction Reynolds number, $Re_\tau$, of approximately 100,000.

Per FIGS. 5A-C, as the friction Reynolds number, $Re_\tau$, increases a greater fraction of turbulent wall stress is present in the large-scale eddies (bold-dashed) which exist only at higher $T^+$ values. Therefore, actuating at those $T^+$ values will have more effect on drag in flows with higher friction Reynolds numbers, $Re_\tau$. FIGS. 5A-C also illustrate that, unexpectedly, optimal actuation parameters at low friction Reynolds numbers, $Re_\tau$, are not a good predictor of drag performance at higher values of friction Reynolds numbers, $Re_\tau$. This unexpected result likely contributed to the existing literature's erroneous conclusion that drag reduction could not be attained at high r values (i.e., at low temporal frequencies).

Figure 6A:
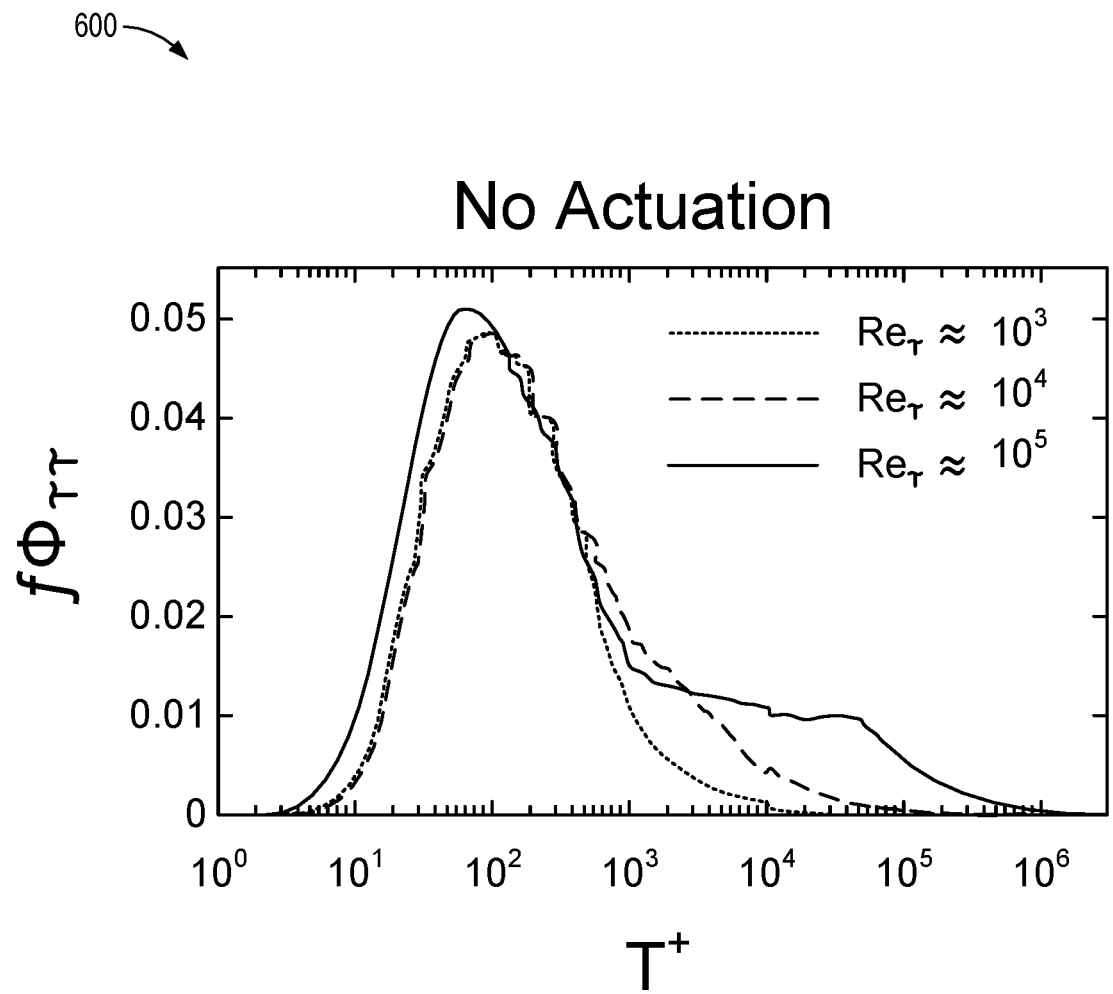
FIG. 6A illustrates a graph of the pre-multiplied spectra of the wall stress for various friction Reynolds numbers, according to one embodiment.

FIG. 6A illustrates a graph 600 of a pre-multiplied spectra of wall stresses for various friction Reynolds numbers, $Re_\tau$, without actuation, according to one embodiment. Without actuation, there is a strong peak in the spectrum at approximately $T^+=100$, which reflects intense high-frequency turbulence generated by near-wall streaks.

Figure 6B:
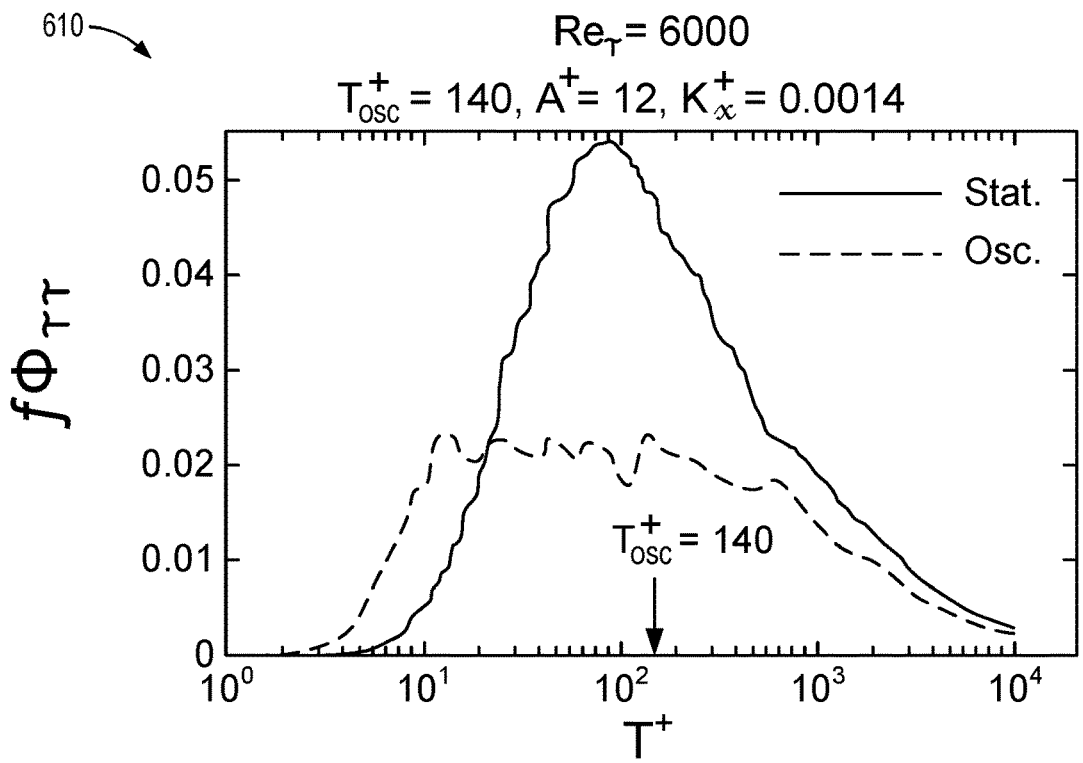
FIG. 6B illustrates a graph of the pre-multiplied spectra of the wall stress with and without small-scale eddy actuation at a friction Reynolds number of 6,000, according to one embodiment.

FIG. 6B illustrates a graph 610 of the pre-multiplied spectra of the wall stress with and without small-scale eddy actuation at a friction Reynolds number, $Re_\tau$, of 6,000, according to one embodiment. The time scale multiplier, $T^+$, used for actuation is 140 (as denoted by the arrow identifying the time scale multiplier, $T^+$ as: $T^+_{osc}=140$).

Figure 6C:
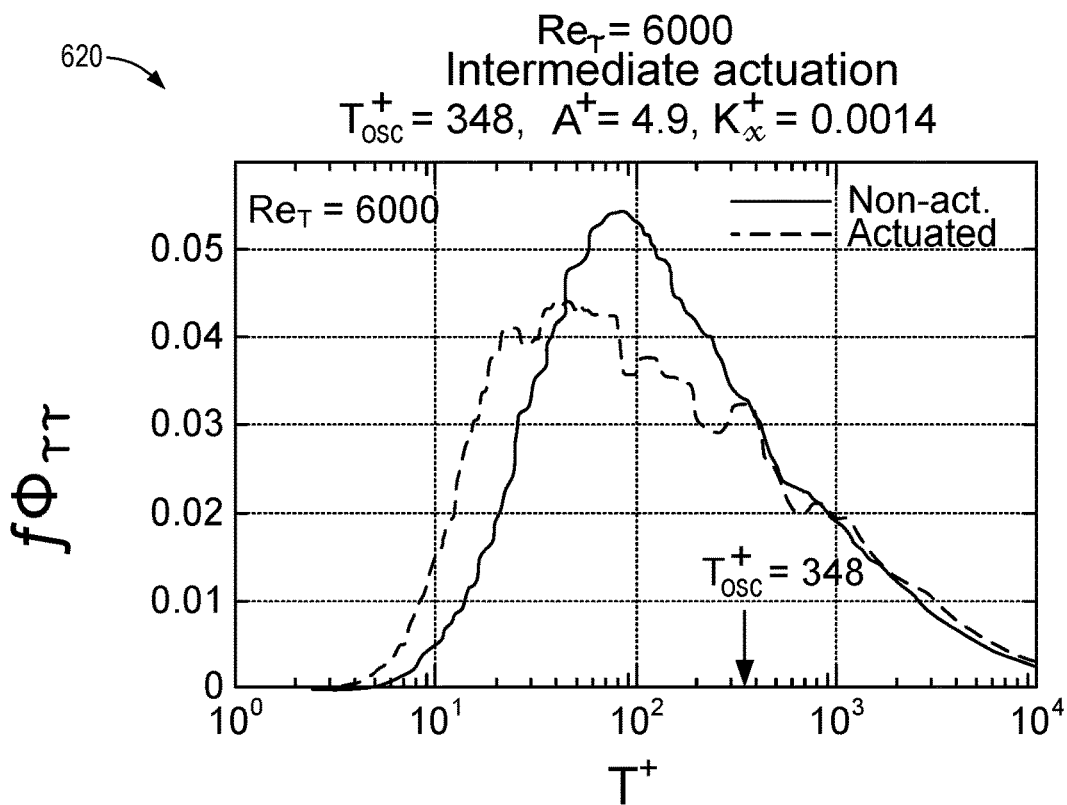
FIG. 6C illustrates a graph of the pre-multiplied spectra of the wall stress with and without large-scale eddy actuation at a friction Reynolds number of 6,000, according to one embodiment.

FIG. 6C illustrates a graph 620 of the pre-multiplied spectra of the wall stress with and without large-scale eddy actuation at a friction Reynolds number, $Re_\tau$, of 6,000, according to one embodiment. The time scale multiplier, $T^+$, used for actuation is 348, which is again denoted by the arrow marking $T^+_{osc}=348$.

Figure 6D:
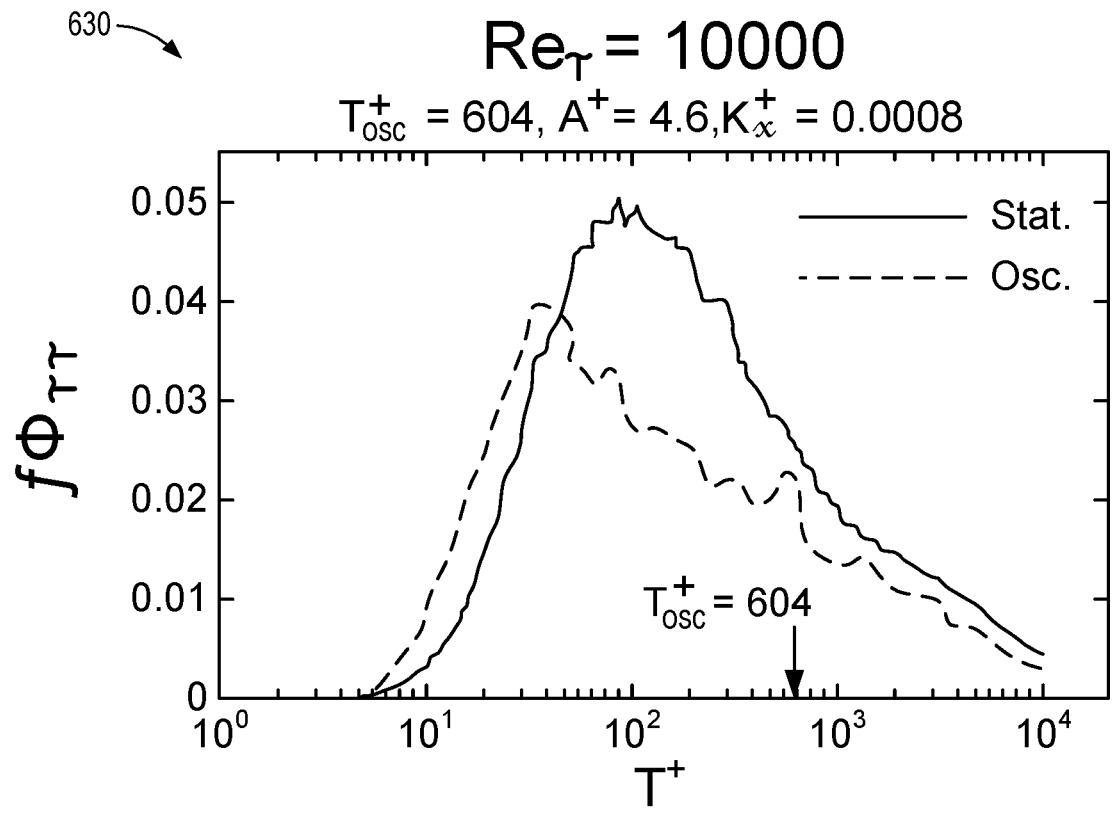
FIG. 6D illustrates a graph of the pre-multiplied spectra of the wall stress with and without large-scale eddy actuation at a friction Reynolds number of 10,000, according to one embodiment.

FIG. 6D illustrates a graph 630 of the pre-multiplied spectra of the wall stress with and without large-scale eddy actuation at a friction Reynolds number, $Re_\tau$, of 10,000, according to one embodiment. The time scale multiplier, $T^+$, used for actuation is 604, which is again denoted by the arrow marking $T^+_{osc}=604$.

In each instance, actuation at a given $T^+_{osc}$ affects a range of stresses. As the friction Reynolds number, $Re_\tau$, increases, proportionally more turbulence is present in higher $T^+$ ranges. It follows that operating (i.e., actuating or oscillating) at a higher $T^+_{osc}$ reduces large-scale eddy turbulence losses, which represent a larger portion of the total losses as the friction Reynolds number, $Re_\tau$, increases, and operation at higher $T^+_{osc}$ also reduces some small-scale eddy losses. It is evident that operating at a specific actuation $T^+_{osc}$ can affect a wide spectrum of wall stresses.

Figure 7B:
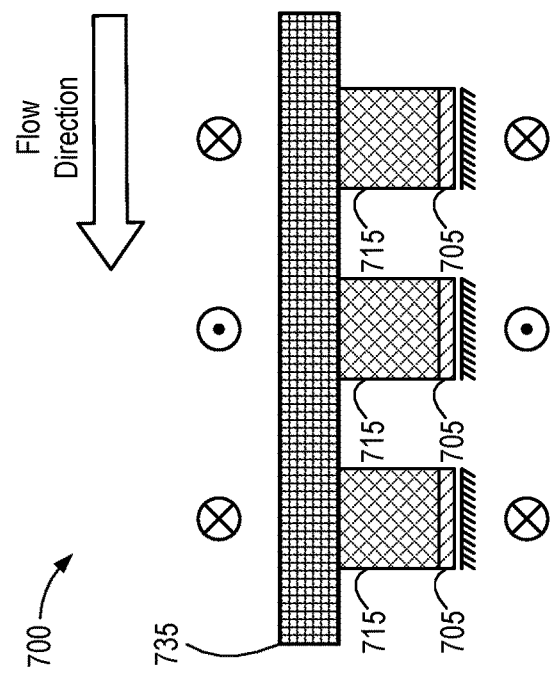
FIG. 7B illustrates a simplified diagram of a transverse or spanwise view of an electronically controlled dielectric elastomer actuator, according to one embodiment.
Figure 7A:
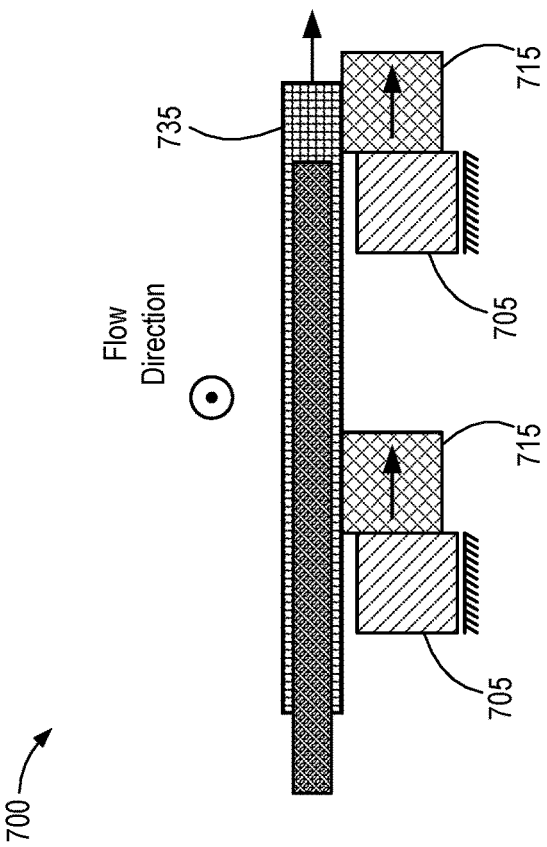
FIG. 7A illustrates a simplified diagram of a streamwise view of an electronically controlled dielectric elastomer actuator, according to one embodiment.

FIG. 7A illustrates a simplified diagram of a streamwise view of an electronically controlled dielectric elastomer actuator 700, according to one embodiment. As illustrated, the dielectric elastomer actuator 700 includes compliant electrodes 715 that are connected to the underside of an elastomer membrane 735. Fixed structures 705 control the direction in which the compliant electrodes 715 and elastomer membrane 735 expand. An electronic controller (e.g., a processor, ASIC, FPGA, microcontroller, etc.) may selectively apply a voltage differential between the compliant electrodes and the fixed structures 705 to cause the elastomer membrane 735 to elongate relative to the fixed structure. The direction of the fluid flow is out of the page (as identified by the circle-dot notation). The movement, and associated momentum injection, of the elastomer actuator 700 is transverse to the direction of the fluid flow.

FIG. 7B illustrates a simplified diagram of a transverse or spanwise view of an electronically controlled dielectric elastomer actuator 700, according to one embodiment. As illustrated, the flow direction is represented as going from right to left, while compliant electrodes 715 of the are energized in opposite directions for transverse momentum injection (e.g., into and out of the page, as denoted by the circle-dot and circle-x notations).

FIG. 8A illustrates a simplified diagram of an adjustable friction surface 800 with a plurality of electronically controlled dielectric elastomer actuators 805 positioned within a structural surface 820. The electronically controlled dielectric elastomer actuators 805 are used to inject momentum transverse to the flow 810 of the fluid over the surface 800. The electronically controlled dielectric elastomer actuators 805 are actuated at low frequencies to disrupt large-scale eddies in a turbulent boundary layer of the fluid flow 810.

FIG. 8B illustrates a cross-sectional view of the adjustable friction surface 800 at a location 890, according to one embodiment. As illustrated, the elastomeric membrane 805 is flush with the upper plane of the structural surface 820.

FIG. 8C illustrates a simplified diagram of a streamwise view of one of the electronically controlled dielectric elastomer actuators 805, according to one embodiment. As illustrated, the dielectric elastomer actuator 805 includes compliant electrodes 815 that are connected to the underside of an elastomer membrane 835. Fixed structures 805 control the direction in which the compliant electrodes 815 and elastomer membrane 835 contract and elongate relative to the fixed structure. As illustrated, a controller 801 may cause the elastomer membranes 835 to move in different directions (alternating opposite directions) that are transverse to the fluid flow 810 at low frequencies to disrupt or otherwise modify the motion of the large-scale eddies of the fluid flow 810.

Figure 9:
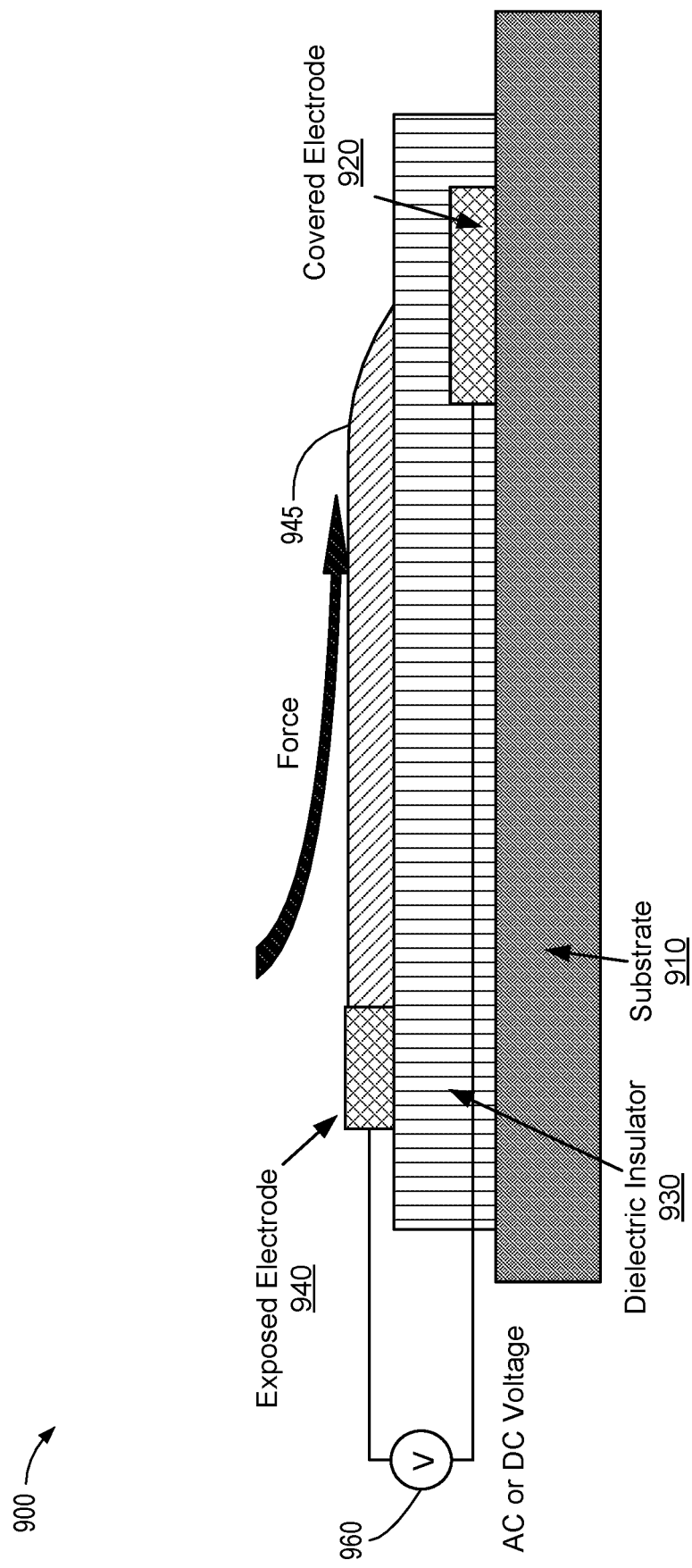
FIG. 9 illustrates a simplified diagram of a dielectric barrier discharge (DBD) actuator, according to one embodiment.

FIG. 9 illustrates a simplified diagram of a DBD actuator 900, also known as a DBD plasma actuator, according to various embodiments. As illustrated, an electronic controller may utilize an AC or pulsed DC voltage source 960 to selectively actuate the DBD actuator 900 and cause it to inject momentum into a fluid in a direction transverse to the flow of the fluid over a surface. The illustrated DBD actuator 900 includes an exposed electrode 940 (that may be partly insulated in some embodiments), a dielectric insulator 930, and a covered electrode 920 (e.g., beneath the dielectric insulator 930). The DBD actuator 900 may be mounted on, for example, a substrate 910 or the surface of an object. A voltage differential applied to the electrodes generates a region of plasma 945. The generated region of plasma 945 creates an ionic wind that can be controlled for transverse momentum injection via an electrohydrodynamic (EHD) force of the ionic wind.

Figure 10:
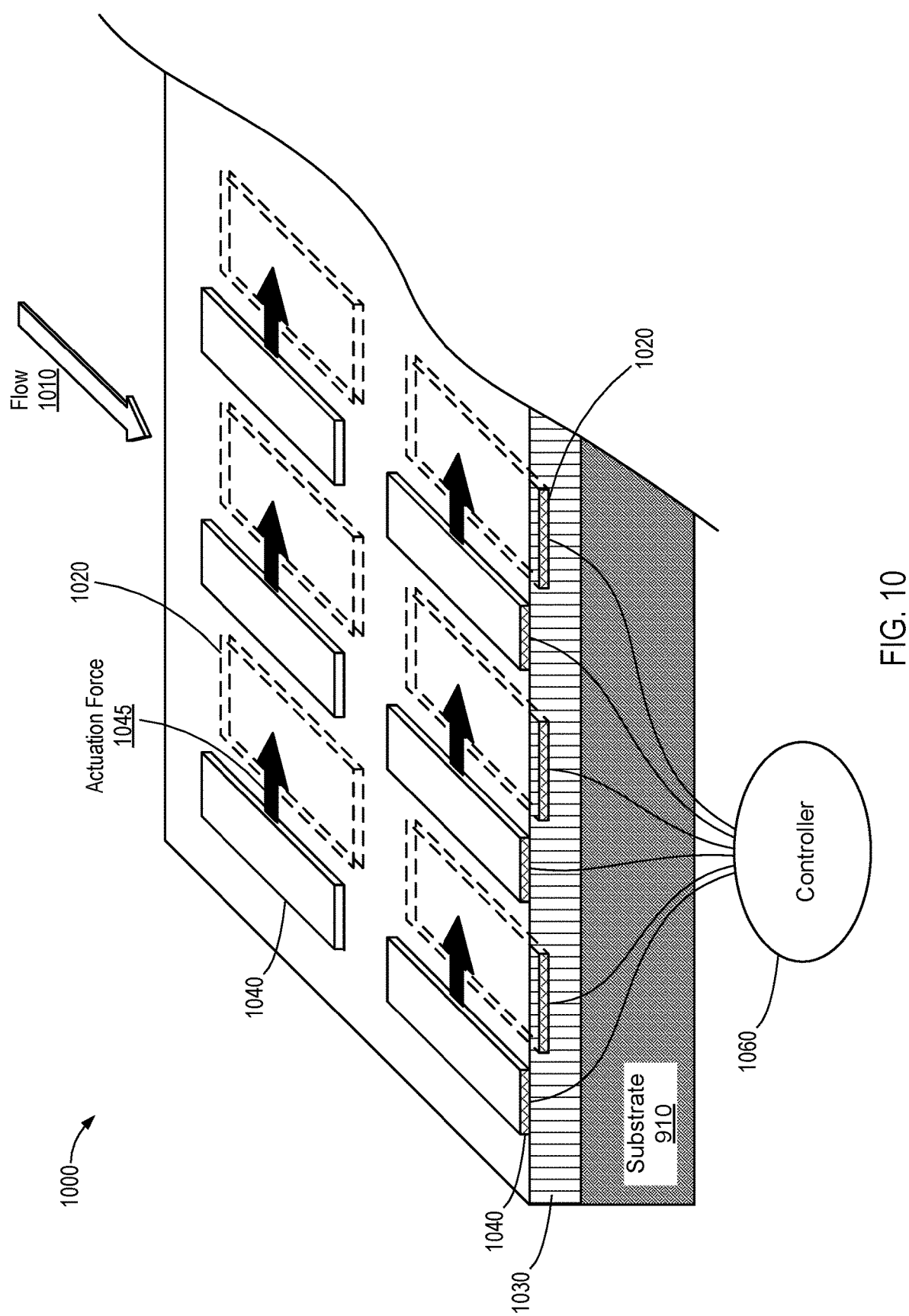
FIG. 10 illustrates a simplified diagram of an array of DBD actuators integrated into a surface, according to one embodiment.

FIG. 10 illustrates a simplified diagram 1000 of an array of DBD actuators integrated into a surface, according to one embodiment. As illustrated, the array of DBD actuators may be formed on a substrate 910. A dielectric insulator layer 1030 includes covered electrodes 1020. Exposed electrodes 1040 are positioned on the dielectric insulator layer 1030 in electrical isolation from the covered electrodes 1020. The direction of fluid flow 1010 is shown in the upper portion of the diagram 1000 as flowing across the surface and lengthwise with respect to the elongated DBD actuators.

As illustrated, a controller 1060 can apply a voltage differential between the exposed electrodes 1040 and the covered electrodes 1020 to generate a region of plasma, resulting in the actuation force 1045 (ionic wind) that is transverse to the direction of the fluid flow 1010. According to various embodiments, the controller 1060 may operate to actuate the DBD actuators in the array of DBD actuators at low frequencies to affect large-scale eddies in the fluid flow 1010.

Figure 11:
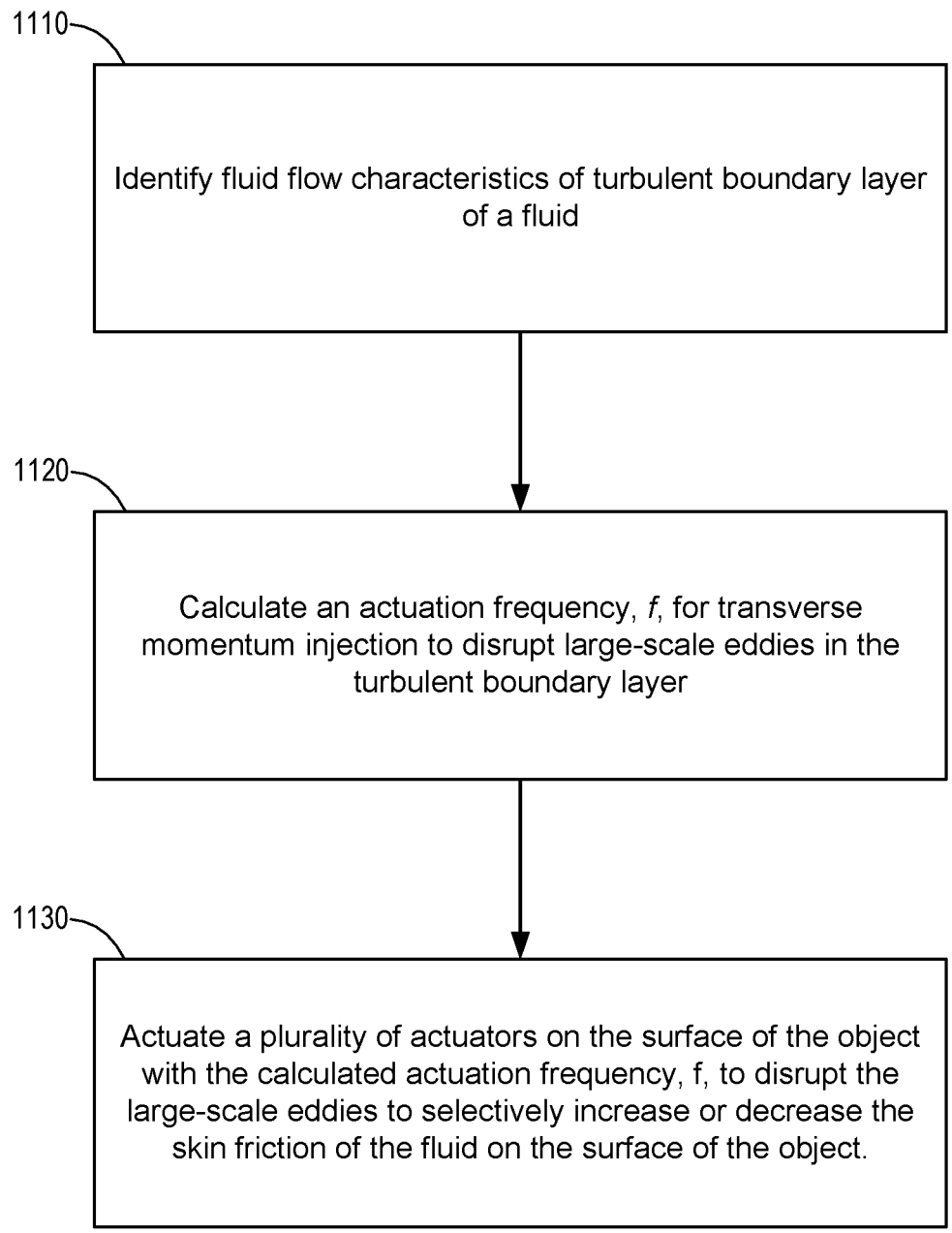
FIG. 11 illustrates a flow chart of an example method to modify drag on a surface via disruption of large-scale eddies in a turbulent boundary layer, according to one embodiment.

FIG. 11 illustrates a flow chart of an example method to modify drag on a surface via disruption of large-scale eddies in a turbulent boundary layer, according to one embodiment. As illustrated, a system or controller may identify, at 1110, fluid flow characteristics of a turbulent boundary layer of a fluid flowing relative to a surface of an object in a streamwise direction. For example, the system or controller may identify a bulk friction velocity, u, a friction velocity, $u_\tau$, of the fluid, and the kinematic viscosity, $v$, of the fluid. The system or controller may calculate, at 1120, an actuation frequency, f, based on a time scale multiplier, $T^+$, for transverse momentum injection along the surface of the object to disrupt large-scale eddies in the turbulent boundary layer for which the time scale is at least 300 times larger than the viscous time scale $\eta'$.

The system or controller may actuate, at 1130, a plurality of actuators on the surface of the object with the calculated actuation frequency, f, to disrupt the large-scale eddies to selectively increase or decrease the drag of the fluid on the surface of the object.

Figure 12:
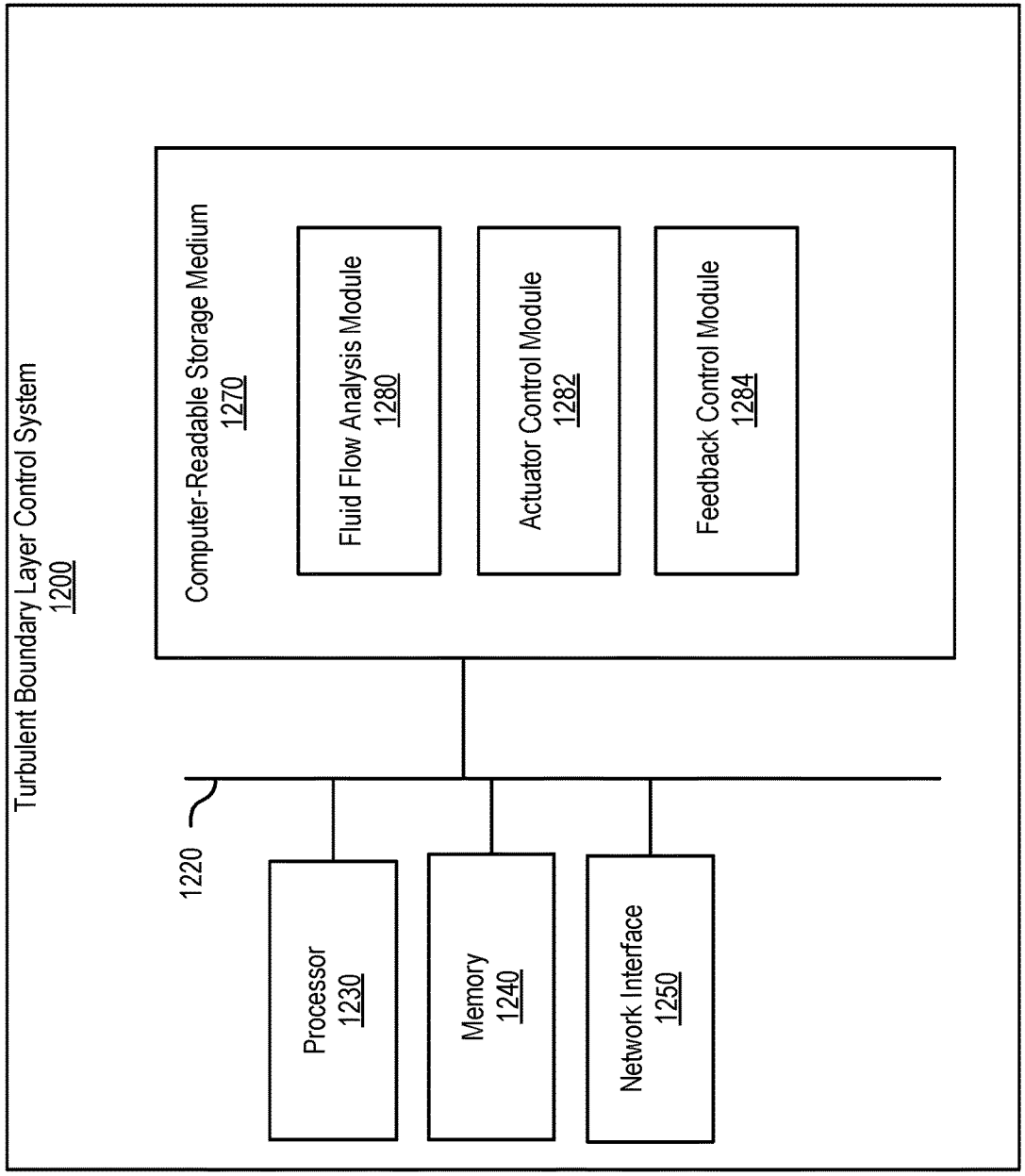
FIG. 12 illustrates an example of a turbulent boundary layer control system, according to one embodiment.

FIG. 12 illustrates a simplified diagram of a turbulent boundary layer control system 1200 to electronically control the amplitude and period of the transverse momentum injection using any of a wide variety of actuation and/or injection devices, according to one embodiment. As illustrated, the system may include a bus 1220 connecting a processor 1230, a memory 1240, a network interface 1250, and a computer-readable storage medium 1270. The computer-readable storage medium 1270 may include a plurality of modules, each of which may comprise computer-executable instructions for implementing specific functions of the turbulent boundary layer control system 1200.

As illustrated, a fluid flow analysis module 1280 may determine the direction of fluid flow over a surface, the speed of the fluid relative to the surface, and/or specific characteristics of the fluid flow. For example, in complex examples, the fluid flow analysis module 1280 may determine specific characteristics of the flow and/or the turbulent boundary layer (e.g., components of the small-scale eddies and/or large-scale eddies). The computer-readable storage medium 1270 may further include an actuator control module 1282 to electronically control the frequency and amplitude of the actuations of sets or subsets of actuators on the surface. Additionally, a feedback control module 1284 may receive feedback from the fluid flow analysis module 1280 and modify the actuations via the actuator control module 1282 to improve drag reduction (or drag increase in some embodiments).

FIGS. 13A-13F illustrate various diagrams of some applications and uses for systems to generate low-frequency transverse momentum injection to disrupt large-scale eddies of a turbulent boundary layer, according to the various embodiments described herein. The examples in FIGS. 13A-F include actuators that may be embodied as any combination of the various actuators to facilitate transverse momentum injection, as described herein. Examples of suitable actuators include, but are not limited to, fluid jet actuators that emit fluid from small holes or openings, DBD actuators, piezoelectric actuators, electromagnetic actuators, electro-mechanical actuators, and/or MEMS actuators.

Figure 13A:
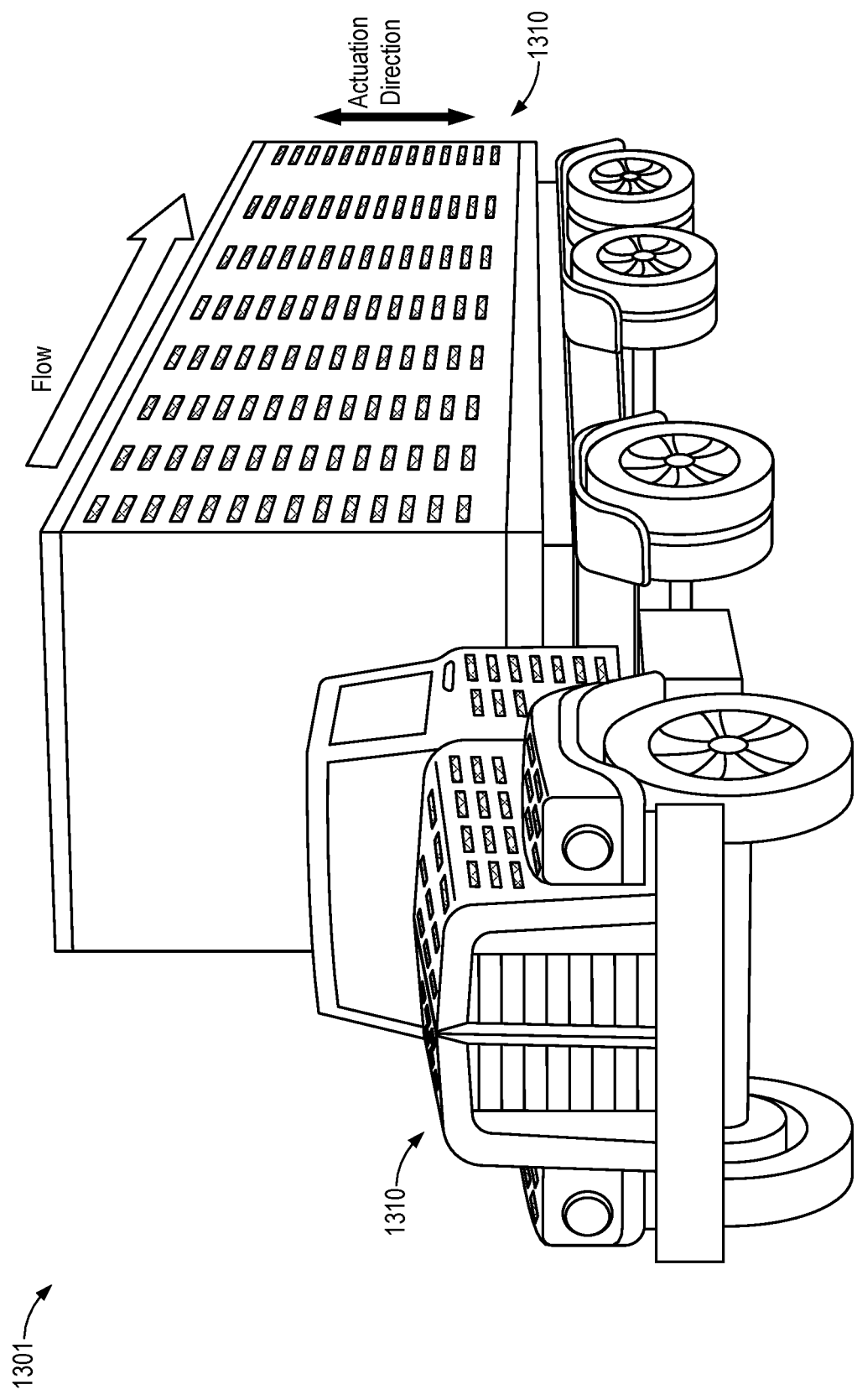
FIG. 13A illustrates a simplified diagram of electronically controlled actuators integrated into the surface of a vehicle to produce low-frequency transverse momentum injection to disrupt large-scale eddies in a turbulent boundary layer, according to one embodiment.

FIG. 13A illustrates a simplified diagram of actuators 1310 integrated into the surface of a vehicle 1301 to produce low-frequency transverse momentum injection to disrupt large-scale eddies of a turbulent boundary layer, according to one embodiment. The illustrated example includes a semi-truck vehicle 1301 with a pattern of actuators 1310 on various surfaces. One or more electronic controllers selectively control all, subsets, or sets of the actuators 1310 to disrupt large-scale eddies in the air (the fluid) as the semi-truck moves through the air. The electronic controller(s) may actuate the actuators 1310 to implement low-frequency transverse momentum injection into the large-scale eddies (e.g., at frequencies less than 10,000 Hz).

The actuators 1310 may be selectively controlled for transverse momentum injection into the large-scale eddies to reduce skin friction drag. In some instances (e.g., when braking), an electronic controller may selectively control the actuators 1310 for transverse momentum injection into the large-scale eddies to increase skin friction drag. The illustrated actuators 1310 represented by shaded rectangles are intended to convey an understanding of possible placement. However, the total number of actuators 1310, the relative sizes of the actuators 1310, the orientation(s) of the actuators 1310, the arrangements of the actuators 1310 (e.g., columns, rows, two-dimensional arrays, etc.), the types of actuators 1310, and/or other specific information may be different than illustrated. As such, the illustration is not intended to convey any information on the actual arrangement, size, orientation, relative quantity, or type of actuator 1310.

In some embodiments, a first subset of the actuators 1310 may be used for transverse momentum injection at low frequencies to affect large-scale eddies to reduce drag and a second subset of the actuators 1310 may be used for transverse momentum injection at high frequencies to affect small-scale eddies. For example, at relatively low velocities where the friction Reynolds number, $Re_\tau$, is less than a first threshold (e.g., 1,500 or 2,500, or 10,000) depending on the embodiment, a first subset of the actuators 1310 may be used for transverse momentum injection at high frequencies to directly modify small-scale eddies near the wall to reduce drag. As the velocity of the fluid relative to the object increases, the friction Reynolds number, $Re_\tau$, may increase beyond the first threshold value.

As the friction Reynolds number, $Re_\tau$, increases, the momentum and frequency required for continued drag reduction via direct modification of small-scale eddies via momentum injection increases beyond physical and/or financial practicality. For example, the extremely high frequencies and magnitudes of momentum required for effective transverse momentum injection in fluid flows with friction Reynolds numbers, $Re_\tau$, above the threshold value may not be physically attainable, may be cost-prohibitive, or may require energy inputs that exceed the energy savings attained by the reduced drag.

Accordingly, the system may identify that the friction Reynolds number, $Re_\tau$, has exceeded the threshold value (e.g., via a directly calculated friction Reynolds number, $Re_\tau$, or based on a relative speed of the object/surface and the fluid). As the friction Reynolds number, $Re_\tau$, passes the threshold value, the system may switch from high-frequency transverse momentum injection to directly affect the small-scale eddies to low-frequency transverse momentum injection to directly affect the large-scale eddies. In some embodiments, the system may utilize the same actuators for both low-frequency transverse momentum injection and high-frequency transverse momentum injection. In other embodiments, the operational frequency range of individual actuators may not be sufficient for both low-frequency transverse momentum injection and high-frequency transverse momentum injection. In such embodiments, the system may utilize a first set of actuators (e.g., mechanical actuators, piezoelectric actuators, actuators, wall-jets, etc.) for low-frequency transverse momentum injection and a second subset of the actuators (of the same type or a different type) for high-frequency transverse momentum injection.

Figure 13B:
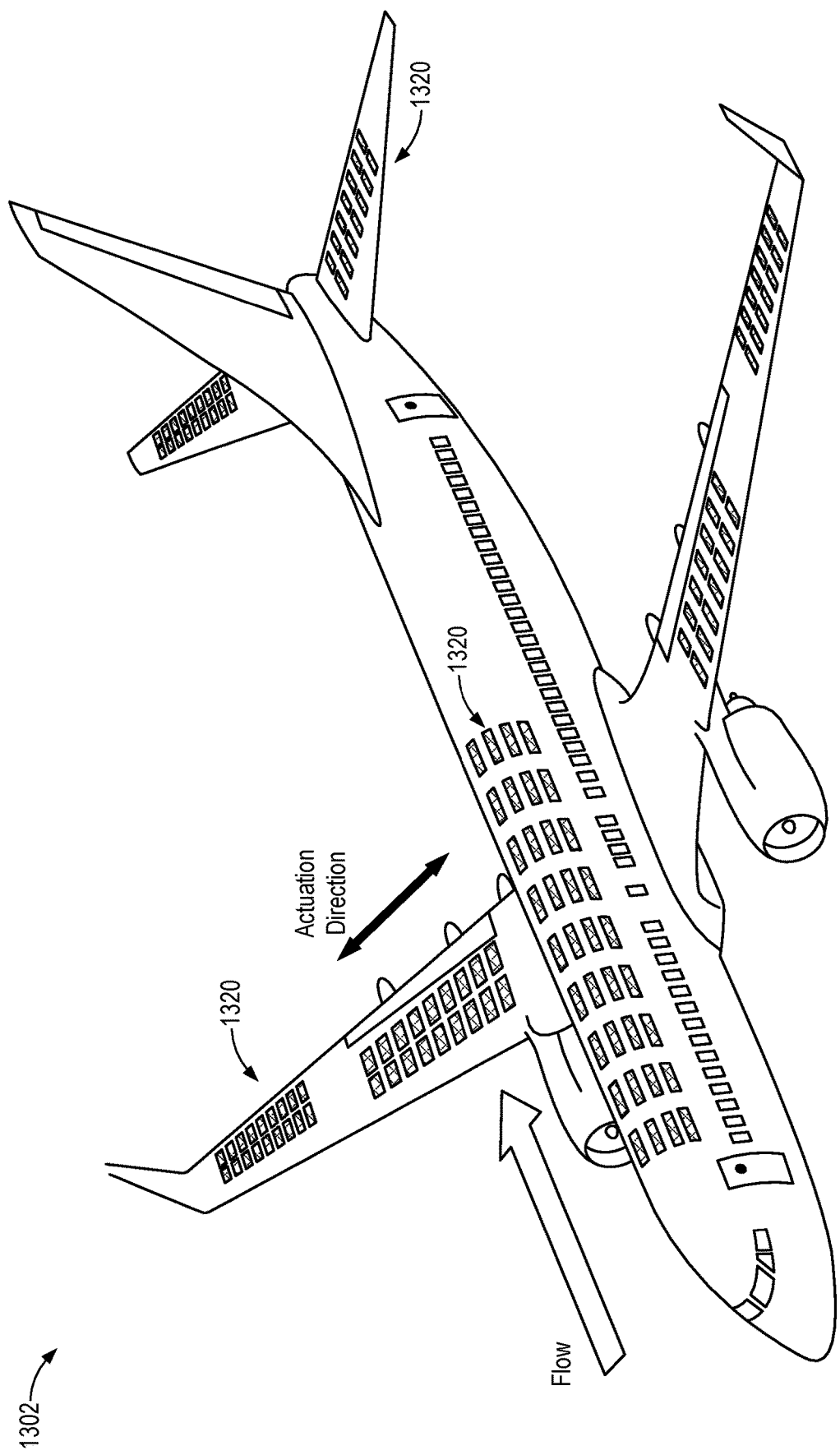
FIG. 13B illustrates a simplified diagram of electronically controlled actuators for low-frequency transverse momentum injection on a wing of an aerial vehicle to disrupt large-scale eddies in a turbulent boundary layer, according to one embodiment.

FIG. 13B illustrates a simplified diagram of electronically controlled actuators 1320 for low-frequency transverse momentum injection on portions of an aerial vehicle 1302 to disrupt large-scale eddies of a turbulent boundary layer, according to one embodiment. As illustrated, arrangements of actuators 1320 may be located on any surface of the aerial vehicle 1302 that may contribute to skin friction drag. The arrangement of actuators 1320 may be random, in columns, in rows, in two-dimensional arrays, and/or based on the expected flow of fluid over the specific portion of the surface.

Figure 13C:
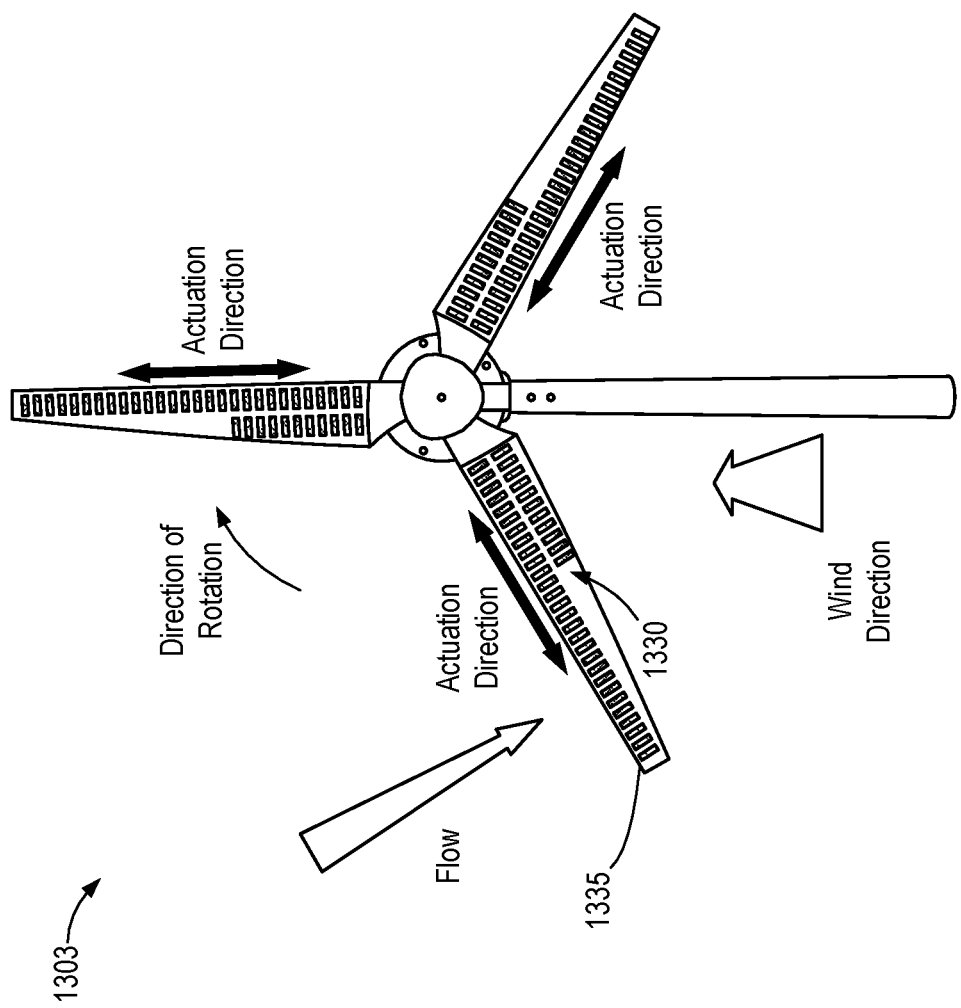
FIG. 13C illustrates a simplified diagram of electronically controlled actuators arranged on a blade of a turbine to produce low-frequency transverse momentum injection to disrupt large-scale eddies in a turbulent boundary layer, according to one embodiment.

FIG. 13C illustrates a simplified diagram of electronically controlled actuators 1330 arranged on a blade 1335 of a wind turbine 1303 to produce low-frequency transverse momentum injection to disrupt large-scale eddies of a turbulent boundary, according to one embodiment. In some embodiments, a first subset of the actuators 1330 may be positioned and actuated on some portions of the wind turbine 1303 to reduce skin friction drag, while a second subset of actuators (not shown) may be positioned and actuated on other portions of the wind turbine 1303 to increase skin friction drag.

In some embodiments, low-frequency actuators 1330 (or another low-frequency transverse momentum injection actuator) may be positioned on the high-speed blades 1335 of the wind turbine where the fluid flow is expected to have a relatively high friction Reynolds number, $Re_\tau$, (e.g., larger than 1,500, 2,500, 5,000, 10,000 or another threshold value). The low-frequency actuators 1330 may be electronically controlled to directly modify the large-scale eddies of a turbulent boundary layer to reduce drag (e.g., skin friction drag).

Figure 13D:
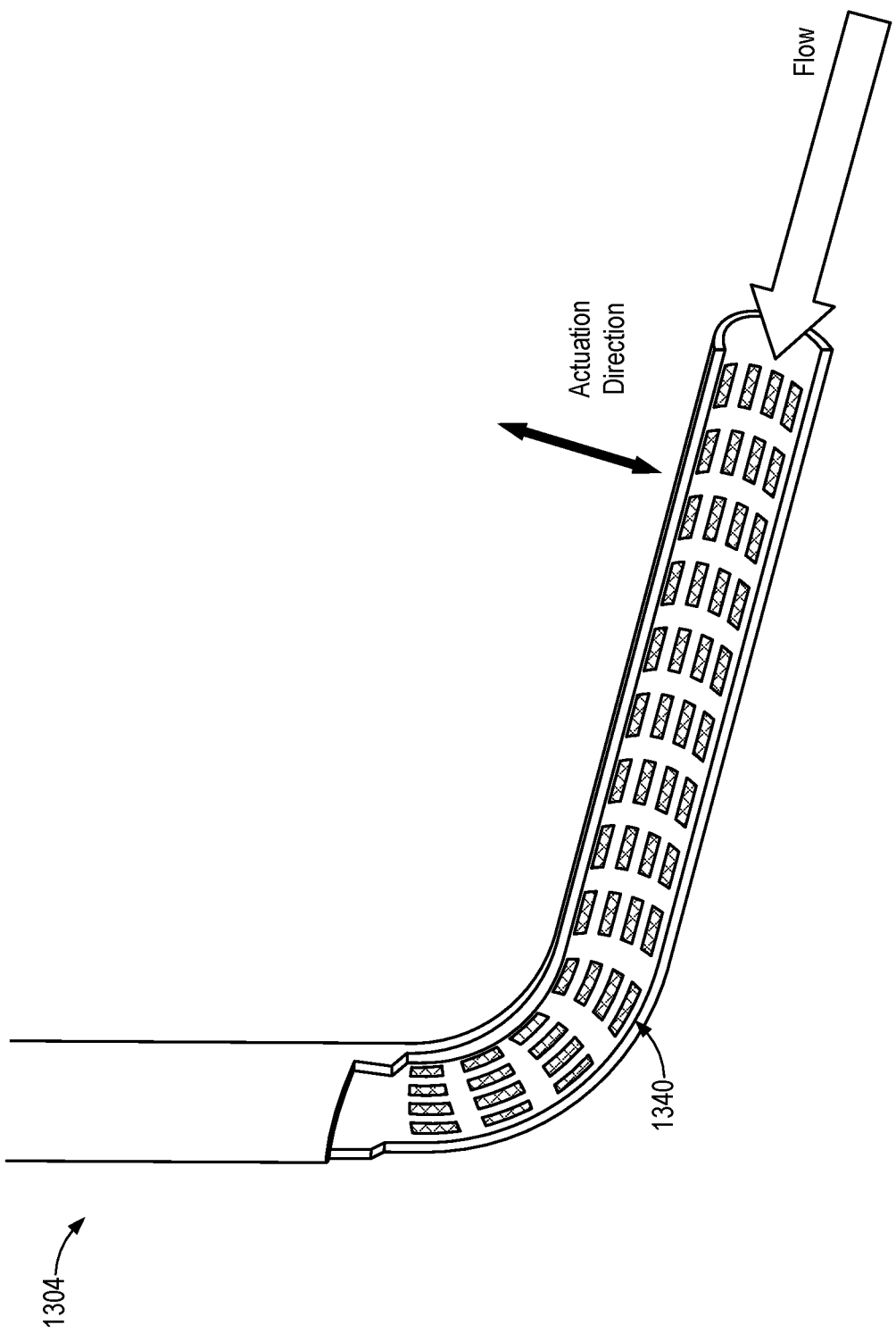
FIG. 13D illustrates a simplified diagram of electronically controlled actuators arranged on the inner surface of a fluid vessel to produce low-frequency transverse momentum injection to disrupt large-scale eddies in a turbulent boundary layer, according to one embodiment.

FIG. 13D illustrates a simplified diagram of electronically controlled actuators 1340 on the inner surface of a pipe 1304 to produce low-frequency transverse momentum injection to disrupt large-scale eddies in a turbulent boundary layer, according to one embodiment. As illustrated, actuators 1340 may be positioned in strategic locations on the inner surface of the pipe 1304 (such as near bends) where skin friction drag is expected to be high as fluid flows through the pipe 1304. In the illustrated embodiment, only a few example actuators 1340 are illustrated to provide an example of possible placement. The total number of actuators 1340, the relative sizes of the actuators 1340, and the arrangements of the actuators 1340 (e.g., columns, rows, two-dimensional arrays, etc.), may be different than illustrated.

Figure 13E:
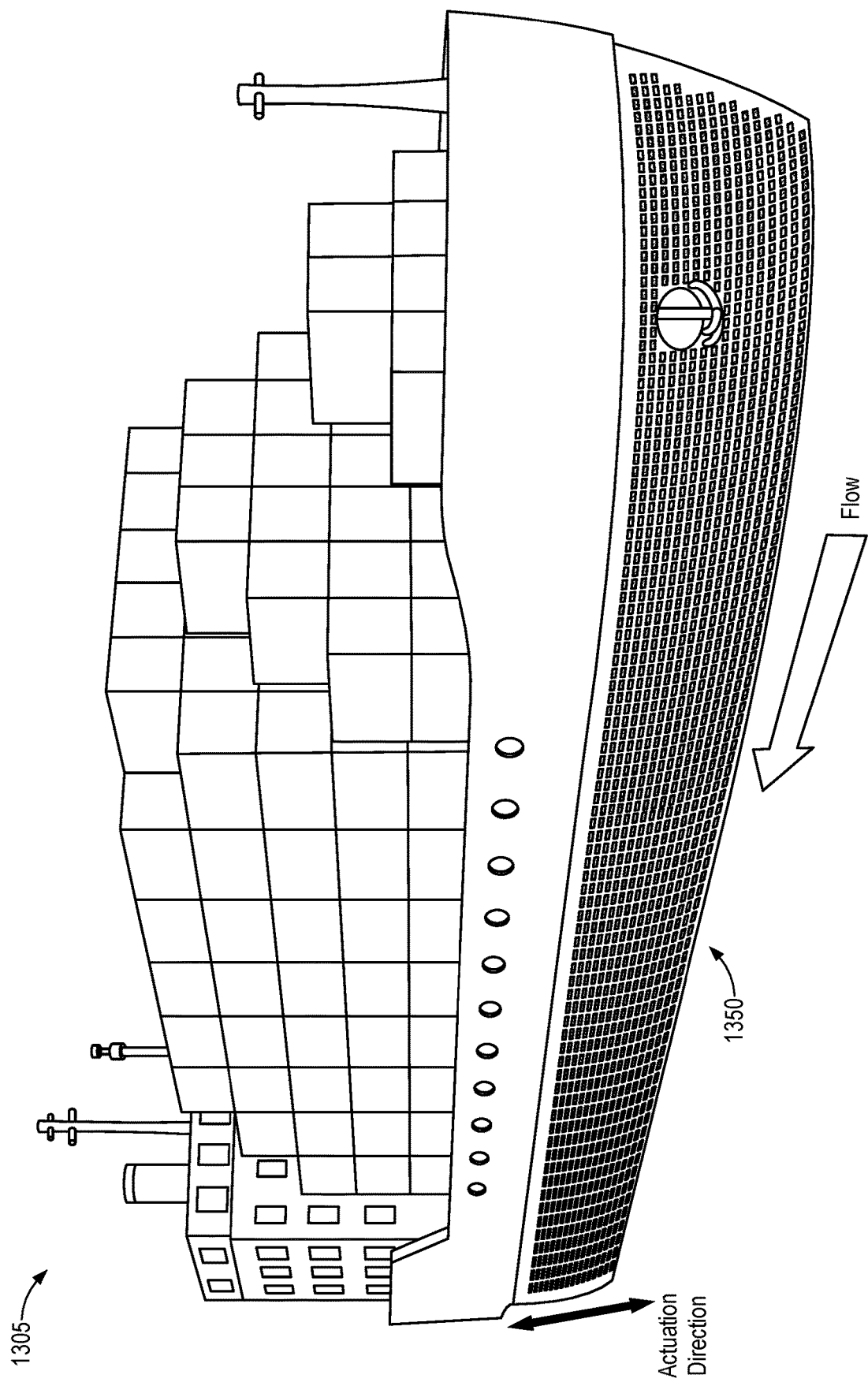
FIG. 13E illustrates a simplified diagram of electronically controlled actuators arranged on the hull of a container ship to produce low-frequency transverse momentum injection to disrupt large-scale eddies in a turbulent boundary layer, according to one embodiment.

FIG. 13E illustrates a simplified diagram of electronically controlled actuators 1350 on the hull of a container ship 1305 to produce low-frequency transverse momentum injection to disrupt large-scale eddies in a turbulent boundary layer, according to one embodiment. The actuators 1350 may be strategically located and selectively controlled to increase or decrease drag as needed. For example, the drag may be increased when the container ship 1305 is stopping. In other instances, transverse momentum injection may be used to disrupt large-scale eddies to decrease drag as the container ship 1305 moves through the water.

Figure 13F:
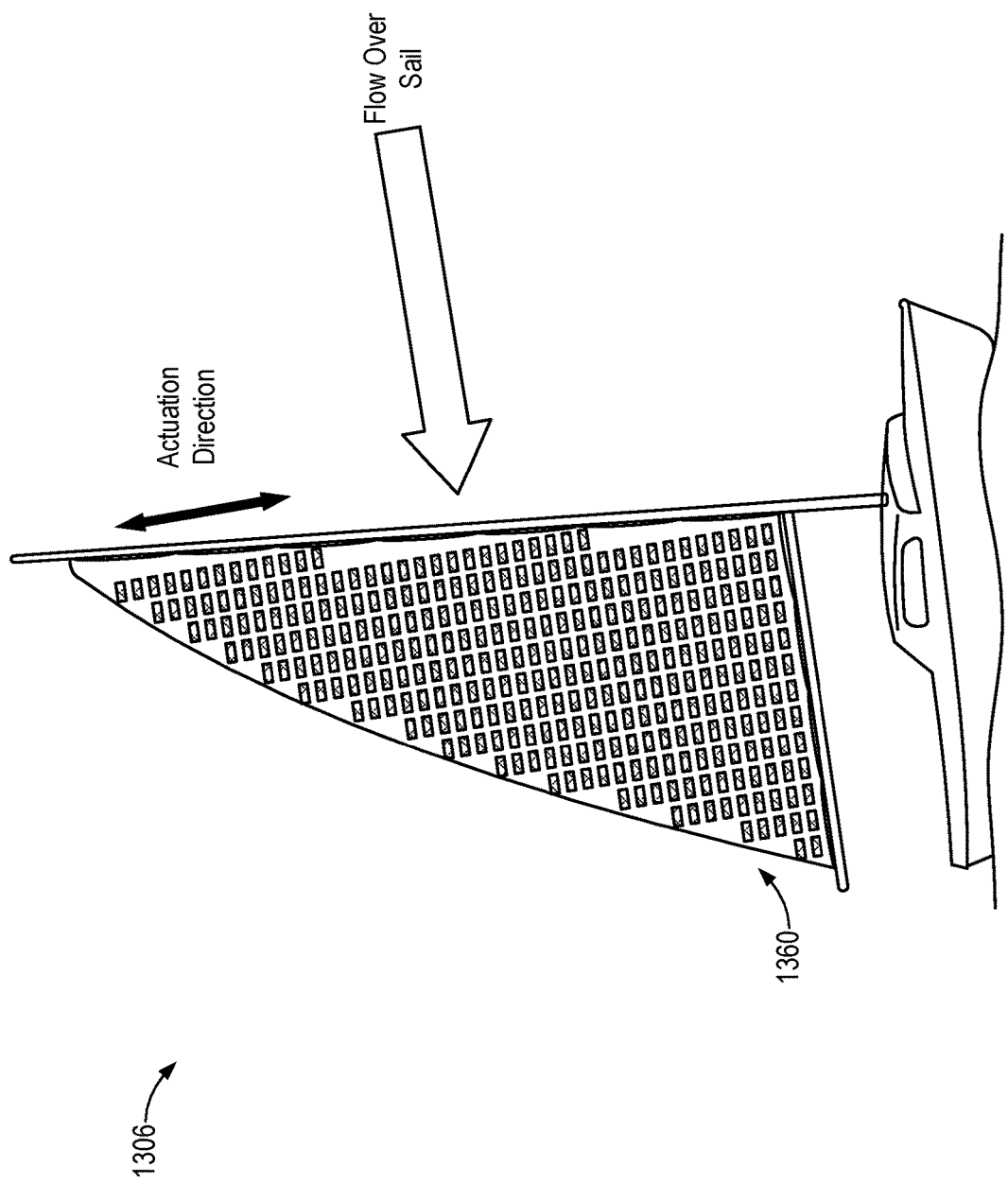
FIG. 13F illustrates a simplified diagram of electronically controlled actuators arranged on an airfoil of a sailboat to produce low-frequency transverse momentum injection to disrupt large-scale eddies in a turbulent boundary layer, according to one embodiment.

FIG. 13F illustrates a simplified diagram of electronically controlled actuators 1360 on one or more sails of a sailboat 1306 to produce low-frequency transverse momentum injection to disrupt large-scale eddies in a turbulent boundary layer, according to one embodiment. Even at high friction Reynolds numbers, $Re_\tau$, a controller may reduce or increase drag by selective in-plane transverse momentum injection via the actuators 1360.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure includes and encompasses at least the following claims and all possible permutations thereof.

What is claimed is:

1. A turbulent boundary layer control system, comprising:
a plurality of actuators on a surface of an object, wherein each actuator is selectively controllable to inject momentum into a turbulent boundary layer of a fluid flowing relative to the surface with a friction Reynolds number, $Re_\tau$, greater than 1,500; and
a controller to operate the plurality of actuators according to an oscillation period based on a time scale multiplier, $T^+$, of at least 300 to inject momentum into the turbulent boundary layer in a direction transverse to a flow direction of the fluid relative to the surface,
wherein the time scale multiplier, $T^+$, is selected such that the injected momentum reduces drag associated with large-scale eddies having a range of characteristic time scales exceeding 300η', where η' is a viscous time scale of the turbulent boundary layer of the fluid.

2. The system of claim 1, wherein the time scale multiplier, $T^+$, is expressible as:

$$T^+ = \frac{1}{f\eta'},$$

where η' is the viscous time scale of the turbulent boundary layer of the fluid and f is an actuation frequency at which the controller operates the plurality of actuators.

3. The system of claim 1, wherein the time scale multiplier, $T^+$, is expressible as:

$$\frac{1}{T^+} = \frac{f*v}{u_\tau^2},$$

where f is the actuation frequency at which the controller operates the plurality of actuators, ν is a kinematic viscosity of the fluid, and $u_\tau$ is a friction velocity.

4. The system of claim 1, wherein the time scale multiplier, $T^+$, for the oscillation period is selected to have a value of 348 for a fluid flow having friction Reynolds number, $Re_\tau$, of 6000.

5. The system of claim 1, wherein the time scale multiplier, $T^+$, for the oscillation period is selected to have a value exceeding 600 for fluid flows having friction Reynolds numbers, $Re_\tau$, exceeding 10,000.

6. The system of claim 1, wherein at least some of the plurality of actuators are spaced on the surface in a direction transverse to the flow direction of the fluid with a spacing distance between one-tenth and one-half of a boundary layer thickness, δ, of the fluid, where the boundary layer thickness, δ, of the fluid is calculated as a function of a friction velocity, $u_\tau$, of the fluid, and a kinematic viscosity, ν, of the fluid.

7. The system of claim 1, wherein the object is selected from a group of objects consisting of: a fixed-wing aircraft, a rotary-wing aircraft, a rocket, a missile, a projectile, a pump, a fan, a turbine, a wind turbine, a mast, an airfoil, a hydrofoil, a sail, a boat rudder, a boat hull, a rocket nozzle, and a vehicle.

8. The system of claim 1, wherein the object is a pipe that operates to implement at least one fluid operation selected from a group of fluid operations consisting of:

transporting the fluid;

mixing the fluid with one or more other substances;

transferring heat from or to the fluid; and managing a chemical reaction of the fluid with a reactant.

9. The system of claim 1, wherein the fluid comprises at least one fluid selected from a group of fluids consisting of: air, water, and oil.

10. The system of claim 1, wherein at least some of the plurality of actuators comprise oscillating surface actuators that are actuated via at least one type of actuation selected from a group of actuation types consisting of: piezoelectric actuation, electromagnetic actuation, and electromechanical actuation.

11. The system of claim 1, wherein at least some of the plurality of actuators comprise dielectric-barrier discharge (DBD) devices.

12. A power-saving method, comprising:

selecting a timescale multiplier, $T^+$, greater than 300 for a fluid flowing over a surface having a friction Reynolds number, $Re_\tau$, greater than 1,500;

calculating an actuation frequency, f, based on the selected time scale multiplier, $T^+$, and the friction Reynolds number, $Re_\tau$, of the fluid; and actuating a plurality of actuators on the surface at the actuation frequency, f, to reduce a friction characteristic of a turbulent boundary layer of the fluid flowing over the surface, wherein the timescale multiplier, $T^+$, is selected such that power consumption to actuate the plurality of actuators at the actuation frequency, f, is less than an amount of power saved due to the reduced friction characteristics of the fluid flowing over the surface.

13. The method of claim 12, wherein the time scale multiplier, $T^+$, is expressible as:

$$T^+ = \frac{1}{f\eta'},$$

where η' is a viscous time scale of the fluid and f is the actuation frequency.

14. The method of claim 12, wherein the friction Reynolds number, $Re_\tau$, of the fluid is determined based on real-time measurements used to estimate a velocity, $u_\tau$, of the fluid and a kinematic viscosity, ν, of the fluid.

15. The method of claim 12, wherein the actuation frequency, f, is less than 20,000 Hz for friction Reynolds numbers, $Re_\tau$, greater than 1,500.

16. The method of claim 12, wherein at least some of the plurality of actuators comprise dielectric-barrier discharge (DBD) devices.

17. The method of claim 12, wherein the surface comprises a surface selected from a group of surfaces consisting of: a surface of a fixed-wing aircraft, a surface of a rotary-wing aircraft, a surface of a rocket, a surface of a missile, a surface of a projectile, a surface of a pump, a surface of a fan, a surface of a turbine, a surface of a wind turbine, a surface of a mast, a surface of an airfoil, a surface of a hydrofoil, a surface of a sail, a surface of a boat rudder, a surface of a boat hull, a surface of a rocket nozzle, and a surface of a vehicle.

18. A method to modify drag on a surface, comprising:

selecting a time scale multiplier, $T^+$, greater than 300 for a viscous time scale, η', in a turbulent boundary layer of a fluid flowing relative to a surface of an object with a friction Reynolds number, $Re_\tau$, greater than 1,500;

calculating an actuation frequency, f, for injecting momentum along the surface of the object and perpendicular to a direction of fluid flow relative to the surface of the object to disrupt the range of large-scale eddies in the turbulent boundary layer with characteristic time scales exceeding 300η'; and actuating a plurality of actuators with the calculated actuation frequency, f, to inject momentum perpendicular to the direction of fluid flow to disrupt the range of large-scale eddies to selectively increase or decrease the drag of the fluid on the surface of the object.

19. The method of claim 18, wherein the time scale multiplier, r, is expressible as:

$$T^+ = \frac{1}{f\eta'},$$

where η' is the viscous time scale of the fluid and f is the actuation frequency.

20. The method of claim 18, wherein the friction Reynolds number, $Re_\tau$, of the fluid is determined based on real-time measurements used to estimate a velocity, $u_\tau$, of the fluid and a kinematic viscosity, ν, of the fluid.

21. The method of claim 18, wherein the time scale multiplier, $T^+$, is expressible as:

$$\frac{1}{T^+} = \frac{f*\nu}{u_\tau^2}.$$

* * * * *